(12) United States Patent
Koyama

(10) Patent No.: US 6,366,963 B2
(45) Date of Patent: *Apr. 2, 2002

(54) METHOD AND APPARATUS FOR PROCESSING INPUT/OUTPUT REQUEST BY USING A PLURALITY OF CHANNEL BUSES

(75) Inventor: Susumu Koyama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,364

(22) Filed: Feb. 10, 1999

Related U.S. Application Data

(62) Division of application No. 08/992,736, filed on Dec. 17, 1997, now Pat. No. 6,029,008, which is a division of application No. 08/503,162, filed on Jul. 17, 1995, now Pat. No. 5,781,800.

(30) Foreign Application Priority Data

Sep. 1, 1994 (JP) ................................................ 208506

(51) Int. Cl.$^7$ ............................................... G06F 13/00
(52) U.S. Cl. .............................. 710/5; 710/17; 710/36; 710/126
(58) Field of Search ........................ 710/1–12, 15–19, 710/36–43, 58–60, 107–118, 126–130

(56) References Cited

U.S. PATENT DOCUMENTS

| | | | |
|---|---|---|---|
| 4,644,462 A | * 2/1987 | Matsubara et al. ............ 710/38 |
| 4,706,190 A | 11/1987 | Bomba et al. ............... 524/386 |
| 4,815,074 A | * 3/1989 | Jacobsen ...................... 370/537 |
| H696 H | * 10/1989 | Davidson ...................... 710/46 |
| 4,901,232 A | 2/1990 | Harrington et al. ............. 710/6 |
| 4,922,410 A | 5/1990 | Morikawa et al. .............. 710/3 |
| 5,276,678 A | * 1/1994 | Hendrickson et al. ....... 370/267 |
| 5,432,923 A | 7/1995 | Taniguchi et al. ........... 710/104 |
| 5,453,983 A | * 9/1995 | O'Connell et al. .......... 370/438 |
| 5,509,126 A | * 4/1996 | Oprescu et al. .............. 710/127 |
| 5,526,484 A | 6/1996 | Casper et al. ................... 710/5 |
| 5,572,694 A | 11/1996 | Uchino ......................... 395/406 |
| 5,781,800 A | * 7/1998 | Koyama ....................... 710/40 |
| 5,933,648 A | * 8/1999 | Landolf et al. .............. 710/240 |

FOREIGN PATENT DOCUMENTS

| EP | 398495 A3 | 11/1990 |
|---|---|---|
| EP | 486230 A1 | 5/1992 |
| JP | 2267653 | 11/1990 |
| JP | 4373056 | 12/1992 |

* cited by examiner

*Primary Examiner*—Christopher B. Shin
(74) *Attorney, Agent, or Firm*—Greer, Burns & Crain, Ltd.

(57) ABSTRACT

With respect to each of low speed and high speed input/output ports of an input/output control unit, an activation time from a time point when an end status in association with the end of transfer is responded to a time point when an activation request is received is measured and stored in a memory. When the high speed port receives an activation request from a high speed channel, the activation time in the memory measured with respect to the low speed port is read out and an input/output request for the low speed port is preferentially accepted for such an activation time. As an activation time of the low speed port, the minimum time, average time, and maximum time are obtained from the result of the measurement. Either one of the above three times is selected as an activation time so as to almost equalize busy ratios of the high speed port and low speed port.

6 Claims, 26 Drawing Sheets

METHOD AND APPARATUS FOR PROCESSING INPUT/OUTPUT REQUEST BY USING A PLURALITY OF CHANNEL BUSES

This is a divisional of application Ser. No. 08/992,736, U.S. Pat. No. 6,029,008 filed Dec. 17, 1997, which is a divisional of Ser. No. 08/503,162, filed Jul. 17, 1995 U.S. Pat. No. 5,781,800.

BACKGROUND OF THE INVENTION

The invention relates to method and apparatus for processing input/output requests by connecting a host computer and an input/output control unit by a plurality of channel buses and, more particularly, method and apparatus for processing input/output requests by using channel buses of different transfer speeds.

FIG. 1 shows an example of an input/output (I/O) subsystem using magnetic tape apparatuses. The input/output subsystem is constructed by: a magnetic tape control unit 410 which functions as an input/output control unit; and a plurality of magnetic tape drive units 412-1 to 412-4 each of which functions as an input/output unit. Devices ID #1 to #4 are defined for the magnetic tape drive units 412-1 to 412-4. The magnetic tape control unit 410 has, for example, two input/output (I/O) ports 420-1 and 420-2. Port numbers (A) and (B) are defined for the I/O ports 420-1 and 420-2. Channel units 416-1 and 416-2 of host computers 414-1 and 414-2 are connected to the I/O ports 420-1 and 420-2 through channel buses 418-1 and 418-2. Channel numbers (A) and (B) are defined for the channel units 416-1 and 416-2. In the following description, the above components are merely expressed as channels (A) and (B) and ports (A) and (B).

A processing operation for an input/output request from the host computer will now be briefly described. For example, it is now assumed that an input/output request such as a write request for a magnetic tape loaded in the magnetic tape drive unit 412-1 was generated by the host computer 414-1. The channel (A) of the host computer 414-1 first generates a start I/O request (activation request) which designates a device machine No. #1 of the magnetic tape drive unit 412-1 to the I/O port (A). In response to the start I/O request from the port (A), the magnetic tape control unit 410 discriminates whether the port (B) has been coupled to the channel (B) or not. When the port (B) is not being coupled, the magnetic tape control unit 410 accepts the start I/O request for the port (A) and is coupled with the channel (A) and responds a normal end of the start I/O request and executes a transferring process of a command sequence.

When the start I/O request from the channel (A) is received by the port (A), if the channel (B) has been coupled, a busy response is returned. When the transferring process by the coupling of the channel (B) and the port (B) is finished, a status response of a unit end is performed from the port (B) to the channel (B) and they are disconnected. In association with the disconnection, a busy end indicative of a busy cancellation is also performed from the port (A) to the channel (A). An activation request is again performed from the channel (A) in the waiting state to the port (A) by the busy response.

In the input/output control unit for processing input/output requests from such a plurality of channels, it is necessary to equivalently execute services for the input/output request of each channel. However, in the case where transfer speeds of the channel buses differ, or a different transfer protocol is used in dependence on the channel, like an electric channel bus or an optical channel bus, there is a tendency such that the services are one-sided to the high speed channel by all means, so that there is a problem of reduction of the services to the low speed channel. As a system environment, in many cases, the high speed host computer and the low/middle speed host computer mixedly exist. Further, the high speed host computer and the middle/low speed host computer are connected so that they can be cross-called. In such a case, a problem similar to that mentioned above occurs. This point will now be described with reference to FIG. 1. For instance, it is now assumed that the channel (A) is a low speed channel and the channel (B) is a high speed channel. An input/output control in this case is executed as shown in, for example, a time chart of FIG. 2.

When a start I/O request 500 is sent from the high speed channel (B) to the port (B) and a coupling completion response 502 by the normal end is obtained, transferring processes 504 and 506 of a command sequence between the high speed channel (B) and the port (B) are executed. Now, assuming that a start I/O port request 508 is generated from the low speed channel (A) to the port (A) for periods of time of the transferring processes 504 and 506, since the port (B) has been coupled, a busy response 510 is returned. After completion of the transferring process 506, a unit end 512 is returned from the port (B) to the high speed channel (B) and the coupling is disconnected. In association with the unit end 512, a busy end 514 indicative of the busy cancellation is subsequently returned from the port (A) to the low speed channel (A) in the waiting state of the busy cancellation. When it is now assumed that the next input/output request has been generated from the high speed channel (B) which received the unit end 512, a start I/O request 516 as an activation request is immediately outputted from the high speed channel (B) to the port (B). After a coupling completion response 518 was performed, transferring processes 520 and 522 are again executed. On the other hand, the low speed channel (A) which received the busy end 514 recognizes the busy cancellation and generates a start I/O request 524 to the port (A). However, it takes a time until the start I/O request 524 is received by the port (A) after the busy end 514 was outputted. For such a period of time, the port (B) has been coupled by the start I/O request 516 from the high speed channel (B). Therefore, for the start I/O request 524 from the low speed channel (A), a busy response 526 is again outputted from the port (A) and the low speed channel (A) again waits for a busy cancellation. Therefore, so long as the input/output request is continuously performed to the high speed channel (B), a loop process of the start I/O request, busy response, and busy end is repeated for the low speed channel (A). The input/output request is not accepted and the services deteriorate. In the worst case, since such a loop process is executed for a long time, there is a problem of the occurrence of a check condition such that the host computer of the low speed channel (A) judges that some abnormality occurred in the channel unit or input/output subsystem. In dependence on a control method, when the input/output request from the high speed channel is continuously performed, there is also no time to respond to the busy end in association with the end of the coupling on the high speed channel side for the low speed channel (A). In such a case, the low speed channel in the busy cancellation waiting state cannot obtain the busy end even if it waits for the busy cancellation for a long time. A situation such that the busy cancellation waiting times out and the input/output request of the low speed channel is finished as an error occurs. As a method of solving the above problem such that the services of the input/output control apparatus are one-sided to a specific channel as mentioned above, there is a method of time-divisionally changing the priority of the route so that the services are equivalently given to each input/output port.

FIG. 3 shows the case where eight channels of ports (A to H) are provided for the input/output control unit. Priorities are sequentially allocated to the ports (A to H) by clocks in accordance with that order. It is now assumed that, for example, there are activation requests to all of the input/output ports (A to H) at time to. In this instance, there is a clock in a slot of the I/O port (C), the priority is set, and the coupling at the I/O port (C) is accepted. With respect to the other I/O ports, the busy response is automatically reported. Now, assuming that there are two activation requests of the I/O ports (B and E) at time t0, the coupling of the I/O port (E) is accepted to a slot of the I/O port (E) at time t1 when the clock changes. With respect to the I/O port (B), the busy response is automatically reported. Such a method of changing the priority of the route time-divisionally is effective in the case where each channel bus has the same performance and also has the same protocol such as electric channel bus or optical channel bus. However, in the case where the transfer speeds are different or the protocols in which an electric channel and an optical channel mixedly exist are different, the above method is not so effective.

SUMMARY OF THE INVENTION

According to the present invention, there are provided method and apparatus in which even if speeds of a plurality of channel buses for connecting a channel of a host computer and input/output ports of an input/output control unit are different, processes for input/output requests can be equivalently executed without one-siding to a specific input/output port.

First, the invention provides an input/output control unit in which a plurality of channels on the upper apparatus side are connected to a plurality of input/output ports through channel buses of different transfer speeds. Specifically speaking, the invention provides an input/output control unit having a high speed input/output port and a low speed input/output port connected respectively to a high speed channel unit and a low speed channel unit on the host side through channel buses of different transfer speeds.

According to the first form of the invention, each of, for example, two input/output ports (A, B) in the input/output control unit has an activation time measurement storing section for measuring and storing an activation time from a time point when a response of a busy cancellation in association with the end of the transfer of the other input/output ports to a time point when the next activation request is received. When the activation request is received from a high speed channel (B) to a high speed input/output port (B) by a route control section, an activation request for the low speed input/output port (B) is waited for the activation time T2 of the low speed input/output port (B) stored in the activation time measurement storing section. When there is an activation request to the low speed input/output port (B) for such a waiting time, the I/O port (B) is coupled to a corresponding low speed channel (B) and a transferring process is executed. When there is an input/output request from a high speed channel unit (A) for a period of time during which the low speed input/output port (B) waits for the activation request, a busy response is returned and the input/output request is not accepted. When there is no activation request from the low speed input/output port (B) for the waiting time, the high speed channel unit (A) is coupled to the high speed input/output port (A) and the transferring process is executed.

The first form of the invention further has a busy ratio measurement storing section for measuring a busy ratio of each of the input/output ports and recording it. In this case, each time activation times T1 and T2 of the input/output ports (A and B) are measured, the activation time measurement storing section produces a maximum time Tmax, an average time Tav, and a minimum time Tmin and stores. The route control section selects the maximum time, average time, or minimum time so as to equalize busy ratios R1 and R2 of the input/output ports (A and B) stored in the busy ratio measurement storing section and sets the waiting time T1 of the activation request of the low speed input/output port (B). A busy ratio (R) has a value obtained by dividing the measured number of busy response times by the number of input/output times from the channel for every input/output port (A and B). When setting the waiting time based on the busy ratios, when the busy ratio R1 of the low speed input/output port (A) is larger than the busy ratio R2 of the high speed input/output port (B), the maximum time Tmax is selected. When the busy ratio R1 of the low speed input/output port (A) is equal to the busy ratio R2 of the high speed input/output port (B), the average time Tav is selected. Further, when the busy ratio R1 of the low speed input/output port (A) is smaller than the busy ratio R2 of the high speed input/output port (B), the minimum time Tmin is selected.

A modification of the first form of the invention is constructed as follows. First, an activation time measuring section to measure an activation time from a time point when a busy cancellation is responded from the low speed input/output port (A) to the low speed channel (A) to a time point when an activation request is received is provided for the input/output control unit. At the time of a response of the busy cancellation from the low speed input/output port (A), the route control section allows a processing request from the high speed channel (B) for the high speed input/output port (B) to be waited for the measured activation time and accepts the processing request from the low speed channel (B) for the low speed input/output port (B) for such a period of time. It is also possible to provide a waiting time setting section for varying the waiting time of the route control section on the basis of the measurement time of the activation time measuring section. Further, a waiting time setting section for setting the waiting time of the route control section by an input operation of an operator can be also provided.

The first form of the invention as mentioned above can be regarded as a learning system. As one of factors of the phenomenon such that the services of the input/output control are one-sided to the high speed channel unit, there can be mentioned a speed which is required from a time point when the channel in the busy cancellation waiting state receives a notification (busy end) of the busy cancellation to a time point when it generates an activation request. Generally, such a time is short in the high speed channel and is long in the low speed channel. Therefore, a timer is provided for each of the input/output ports, thereby dynamically measuring an activation time until the activation request is received after the busy cancellation was responded and storing. The measurement result of the activation time is divisionally calculated and stored with respect to the maximum value, minimum value, and average value. For example, even when the high speed input/output port continuously accepts the activation request after the unit end, an acceptance response is not immediately executed but the I/O control unit waits for the activation request of the low speed port for only the activation time. When there is an activation request from the low speed input/output port, which one of the high speed port and the low speed port is accepted is judged, thereby preventing the services from being prejudiced to only one side. A busy ratio is used as one index indicative of a one-sided state of services. The busy ratio is obtained by dividing the number of busy responses obtained by a busy response counter by a value of an activation number counter for counting the number of activation times from the channels. The waiting time is determined so as to set the busy ratio of each input/output port to a value as small as possible and so as not to increase differences of the values of the busy ratios of the input/output ports. After the response of the busy cancellation, for example, when the busy ratio of the input/output port which responded is high, the apparatus waits at a value near the maximum value of the activation time. On the contrary, when the busy ratio of the input/output port is low and the busy ratio of the other input/output port is high, the apparatus waits at a value near the minimum value. As mentioned above, according to the first form of the invention, the services of each channel can be uniformed by a self learning.

According to the second form of the invention, when a loop such that a busy response to the activation request and a response of a busy cancellation (busy end) in association with the end of the transfer of the other input/output ports are repeated occurs in any one of a plurality of input/output ports, the number of occurring times of such a loop is counted and when a judging section judges that such a number exceeds a predetermined value, an acceptance of the activation request is preferentially allocated to the input/output port judged by the route control section. That is, the route control section accepts only the activation request for the input/output port to which the acceptance of the activation request was preferentially allocated and makes a busy response to the activation request to the other input/output ports.

According to the second form of the invention as mentioned above, when the loop process of the busy response and busy end response continues for a long time, a check condition occurs on the host side. Therefore, such a state is prevented. Namely, the number of loop processing times of the activation request, busy response, and busy end response is detected by the counter. The services are preferentially given to the input/output port in which a count value exceeds a predetermined value. A busy is responded to the other I/O ports. After completion of the preferential process at the input/output port, the counter of such an input/output port is reset. Thus, the check condition which occurs when the busy response and the busy end response are looped can be avoided.

According to the third form of the invention, a busy response time storing section stores a time at which a busy response is performed for an activation request with respect to each of a plurality of input/output ports (A and B). A processing port deciding section decides the input/output port having the oldest response time among the busy response times to the next processing port every completion of the process for the activation request. The route control section preferentially allocates the acceptance of the activation request to the decided input/output port.

Such a third form of the invention can be regarded as a time series processing system. Namely, the time at which the busy response was performed at each input/output port is stored and when the process with the channel is finished, a busy response time of each input/output port is examined. A busy end is reported to the input/output port indicative of the oldest time and the services are preferentially executed.

According to the fourth form of the invention, when the specific channel (B) and the input/output port (B) are coupled by the route control section, if there is an activation request to the other input/output port (A) from the other channel (A), a retry interruption processing section responds a retry status from the other input/output port (B) and disconnects the coupling with the other channel unit (B). When the coupling of the input/output port (A) and the channel (A) which are being processed at present is finished, the retry interruption processing section notifies the interruption of the retry start from the other input/output port (A) to the other channel (A), thereby retrying the activation request.

Such a fourth form of the invention can be regarded as a retry interruption system. That is, during the coupling with the channel, when an activation from the other channel comes, the status to request the retry of the channel is reported in place of the busy response and the coupling with the channel which was activated later is once disconnected. When the coupling with the channel that is at present being processed is finished, the retry start is interrupted to the channel which has already performed the retry request and the recoupling is performed. By responding the retry status in place of the busy response as mentioned above, which one of the input/output ports is recoupled on the input/output control unit side can be determined. The services can be averagely given to each input/output port.

According to the fifth form of the invention, in the case where predetermined interrupting conditions are satisfied by the route control section when the specific channel (B) and the input/output port (B) are coupled, for example, in the case where an interruption timer times up, the interrupting process is executed by the retry interruption processing section. The retry interrupting process is executed by the following procedure.

A retry status is responded to the channel (B) from the input/output port (B), the process is interrupted, and the coupling is disconnected.

When the disconnection is finished, the busy response statuses so far are checked with respect to all of the ports (A and B) and the preferential processing port is decided. For example, the port (A) which performed the busy response before is determined as a preferential processing port.

Subsequently, an end status is responded from the preferential processing port (A) to the channel (A), thereby performing the activation request.

When the transferring process in association with the activation request is finished, the retry interruption processing section notifies the interruption of the retry start from the input/output port (B) to the channel (B), thereby restarting the interrupted process.

The interrupting conditions of the retry interruption are set as follows.

I. The coupling time of the input/output port reaches a predetermined time.

II. The number of command processing times of the input/output ports coupled reaches a predetermined value.

III. When the input/output port is coupled, the busy ratio reaches a predetermined value by the busy response for the activation request to the other input/output ports.

And the like.

Such a fifth form of the invention can be regarded as a modification of the retry interruption system of the fourth form. First, when predetermined interrupting conditions (predetermined time, predetermined number of command processing times, predetermined busy ratio, etc.) are satisfied during the coupling with the channel, an interruption is generated, a status of a channel retry request is responded to the channel which has already been coupled at present, the process is interrupted, and the coupling is once disconnected. After that, with respect to all of the buses, whether the busy response has been performed before or not is discriminated, an interruption factor is analyzed as a check factor, and to which input/output port the services are given is determined. After the processing port was decided, the unit end is responded from such a port, and the process is preferentially executed. After completion of the preferential process, an interruption of the retry start is notified to the channel which performed the status response of the retry request. The channel is again coupled and the interrupted process is restarted. Thus, a situation such that the process of the high speed channel continues and the unit end to cancel the busy response cannot be reported by the low speed channel can be avoided.

In the sixth form of the invention, a command analysis executing section is provided every plurality of input/output ports (A and B). For example, the command analysis executing section analyzes whether a command received in association with an activation request by the input/output port (A) is an executable command or not during the coupling of the input/output port (B). When it is the executable command, the activation request is accepted and the command process for an internal resource is executed. Specifically speaking, when a data transfer of the internal resource is being executed by the coupling of the input/output port (B), in case of other internal resources and a command of a control system which is not accompanied with the data transfer, the activation request of the input/output port (A) is accepted and a command process for other internal resources is executed. The internal resources are a plurality of input/output apparatuses having independent control buses for a data bus, for instance, magnetic tape drive units.

Such a sixth form of the invention can be regarded as an intelligent type of an input/output port which functions as a channel switch. That is, during a command process of another input/output port, a check is made to see if the command received by the input/output port itself can be executed or not. When it can be executed, a process for a drive unit of a lower order is executed, thereby reducing the number of busy response times. For instance, during the coupling of another input/output port, if there is an activation request in a certain input/output port, it is accepted and a command is analyzed and in case of internal resources which are common to the input/output port during the coupling, for example, in case of a command which doesn't use the data bus such as a control command of a motion system or sense system, such a command is validly accepted and executed. Such an intelligent apparatus forming process is effective in the case where the data bus and a command processing bus are different or, even in case of a common bus, the apparatus has a hardware of a common bus configuration such that both of a data transfer and a data transfer for a command process can be concurrently executed.

The above and other objects, features, and advantages of the present invention will become more apparent from the following detailed description with reference to the drawings.

DETAILED DESCRIPTION OF THE PREFERRED EMBODIMENTS

[System Construction]

Figure 1:
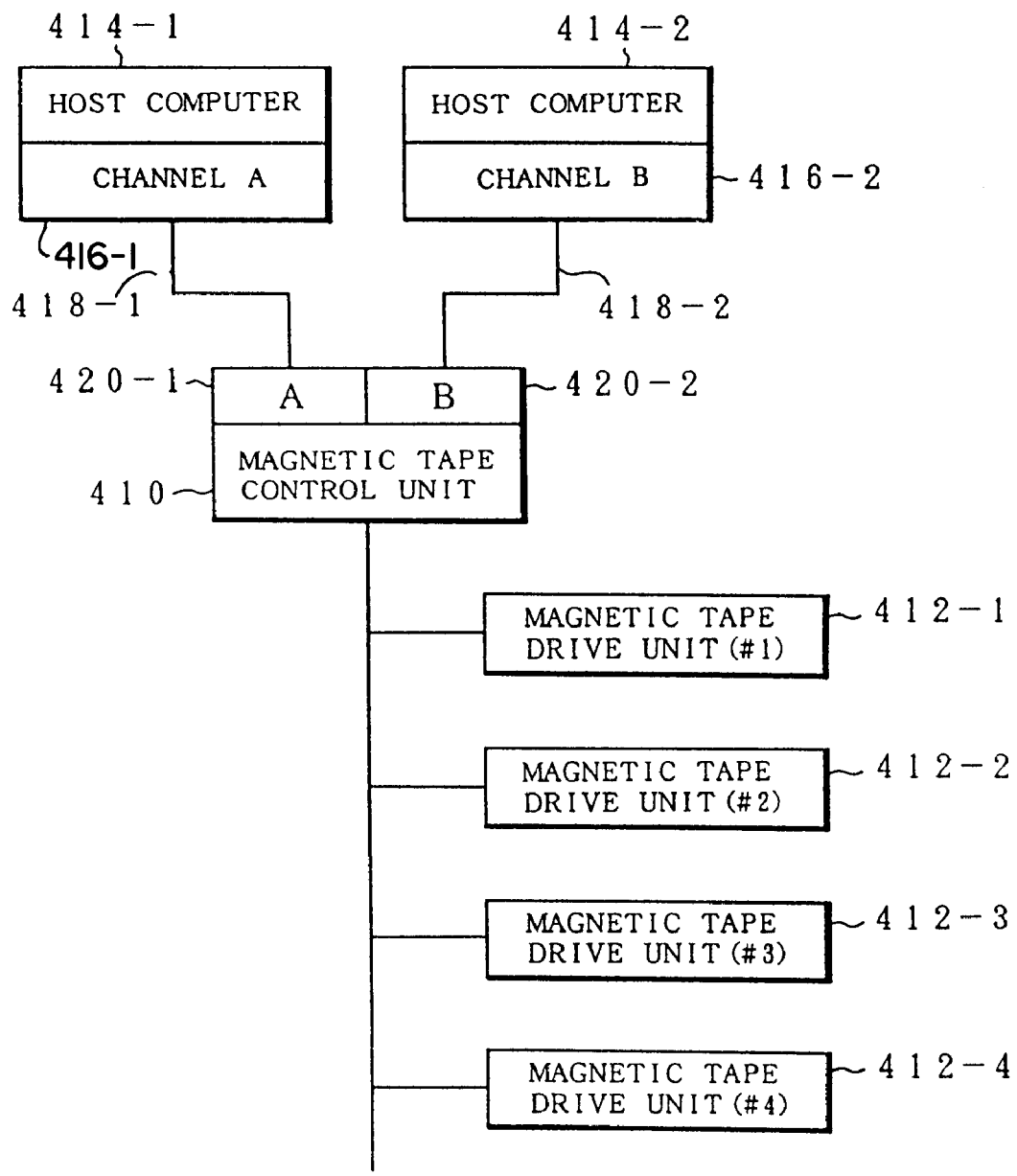
FIG. 1 is a block diagram of a conventional apparatus.
Figure 2:
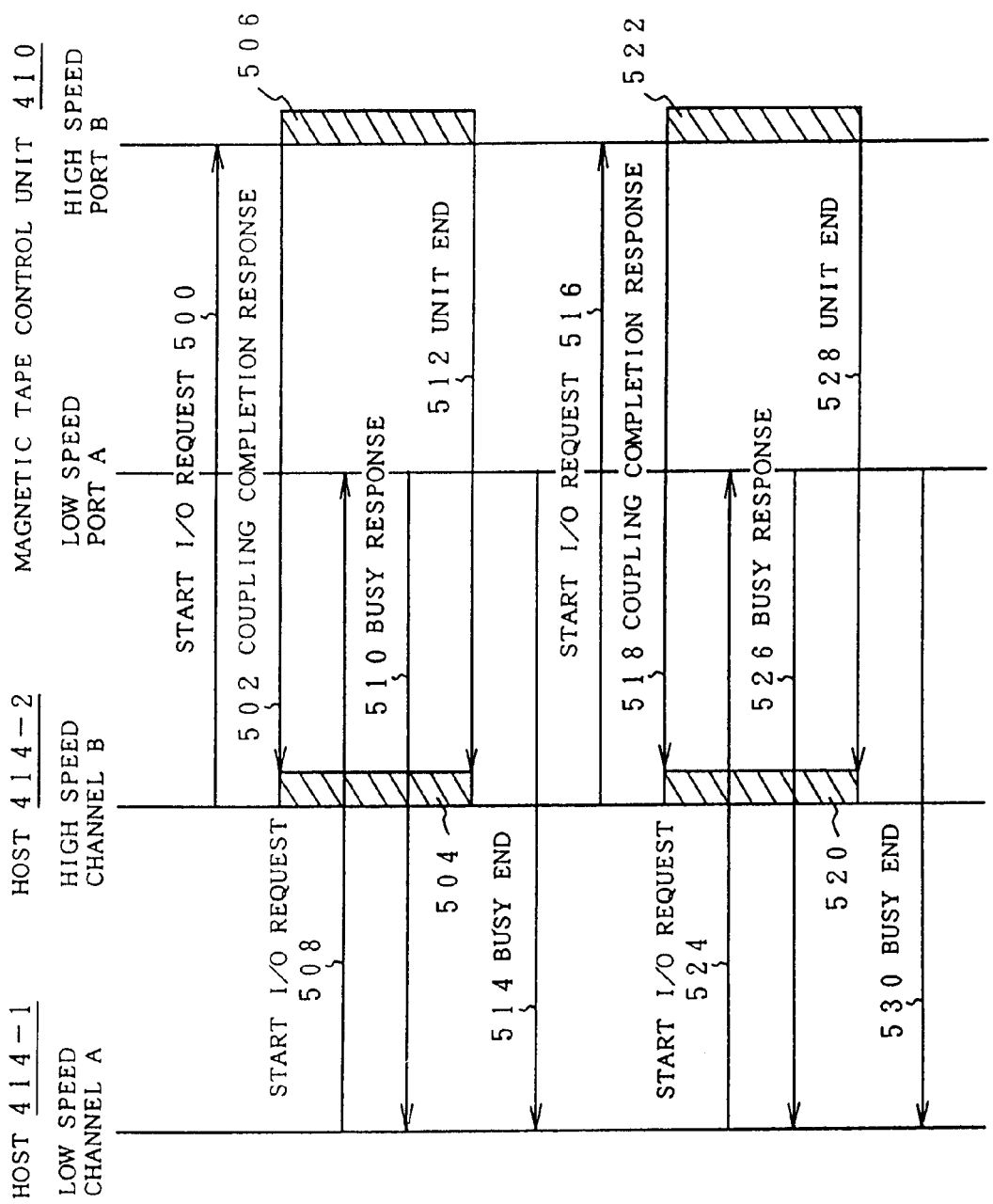
FIG. 2 is a time chart of a circulation of a busy-unit end which occurs in a conventional input/output control.
Figure 3:
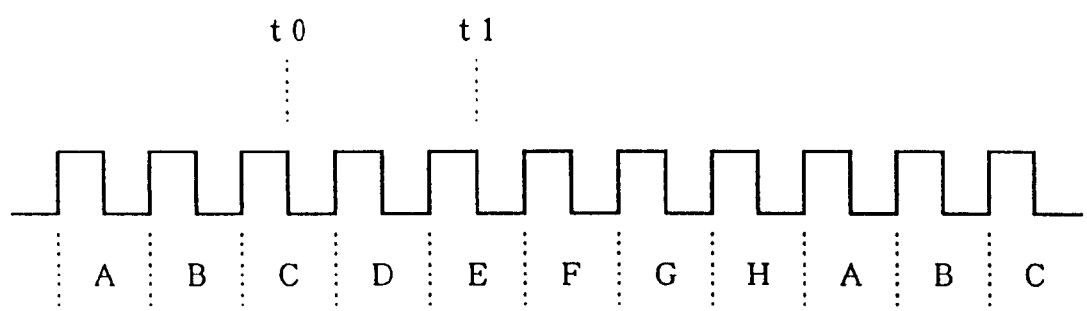
FIG. 3 is an explanatory diagram of a conventional control in which a time slot synchronized with a clock is allocated to an input/output port.
Figure 4:
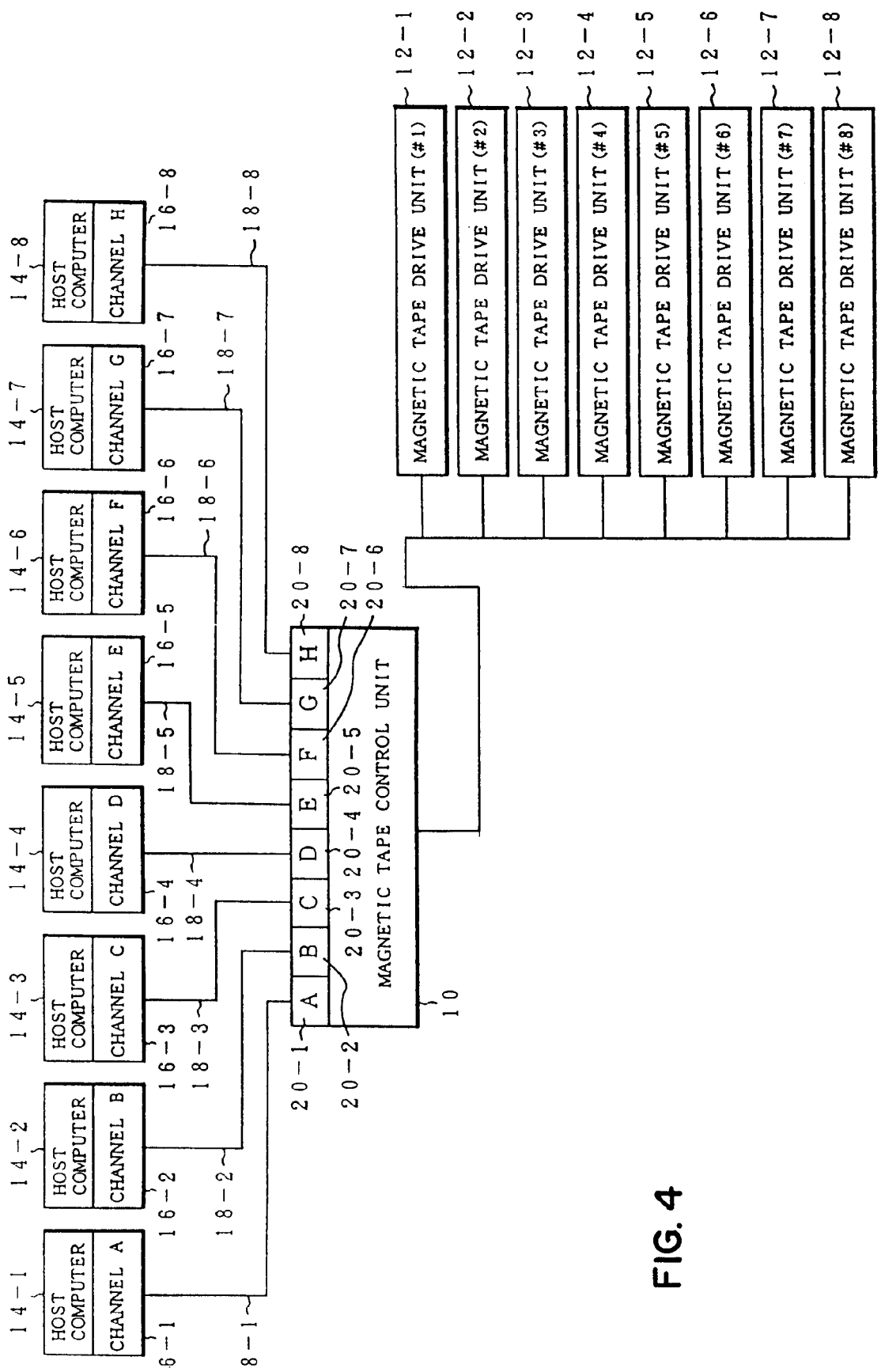
FIG. 4 is a block diagram of a system to which the invention is applied.

FIG. 4 shows a system construction of the invention using magnetic tape apparatuses as drive units. In FIG. 4, in the embodiment, eight magnetic tape drive units 12-1 to 12-8 are connected to a magnetic tape control unit 10 which functions as an input/output (I/O) control unit through a device interface (I/F) 25. Drive IDs #1 to #8 are preset to the magnetic tape drive units 12-1 to 12-8. In the embodiment, the magnetic tape control unit 10 has eight input/output ports 20-1 to 20-8. Port numbers (A to H) are defined for the I/O ports 20-1 to 20-8. In the following description, the port numbers (A to H) are simply expressed as ports (A to H). Channel units 16-1 to 16-8 provided for host computers 14-1 to 14-8 are connected to the ports (A to H) of the magnetic tape control unit 10 through channel buses 18-1 to 18-8, respectively. Channel numbers (A to H) are defined for the channel units 16-1 to 16-8. In the following description, the channel numbers (A to H) are simply expressed as channels (A to H). The channels (A to H) of the host computers 14-1 to 14-8 and the channel buses 18-1 to 18-8 between the ports (A to H) of the magnetic tape control unit 10 have peculiar transfer speeds, respectively. For example, the channel bus 18-1 connecting the channel (A) and the port (A) is an electrical channel bus and its transfer speed is set to 4.5 MBs. A block multiplex channel interface (BMC) made by IBM corporation can be used as an electric channel bus 18-1. The channel bus 18-2 connecting the channel (B) and the port (B) is, for instance, an optical channel bus and its transfer speed is so high to be 9 MBs. For example, an ESCON channel made by IBM corporation can be used as an optical channel bus 18-2. With respect to the remaining channel buses 18-3 to 18-8, channel buses each having a peculiar transfer speed are used. In the invention, it is sufficient to provide at least two channel buses of a high transfer speed and a low transfer speed. For example, the electric channel bus 18-1 of the transfer speed of 4.5 MBs becomes the low speed channel bus. On the other hand, the channel bus 18-2 using the optical channel bus becomes the high speed channel bus because the transfer speed is equal to 9 MBs. In the following description, the channel (A) of the low speed channel bus 18-1 is referred to as a low speed channel. The channel (B) of the high speed channel bus 18-2 is referred to as a high speed channel. Similarly, with respect to the ports (A and B) as well, the port (A) is referred to as a low speed input/output port and the port (B) is referred to as a high speed input/output port.

Figure 5:
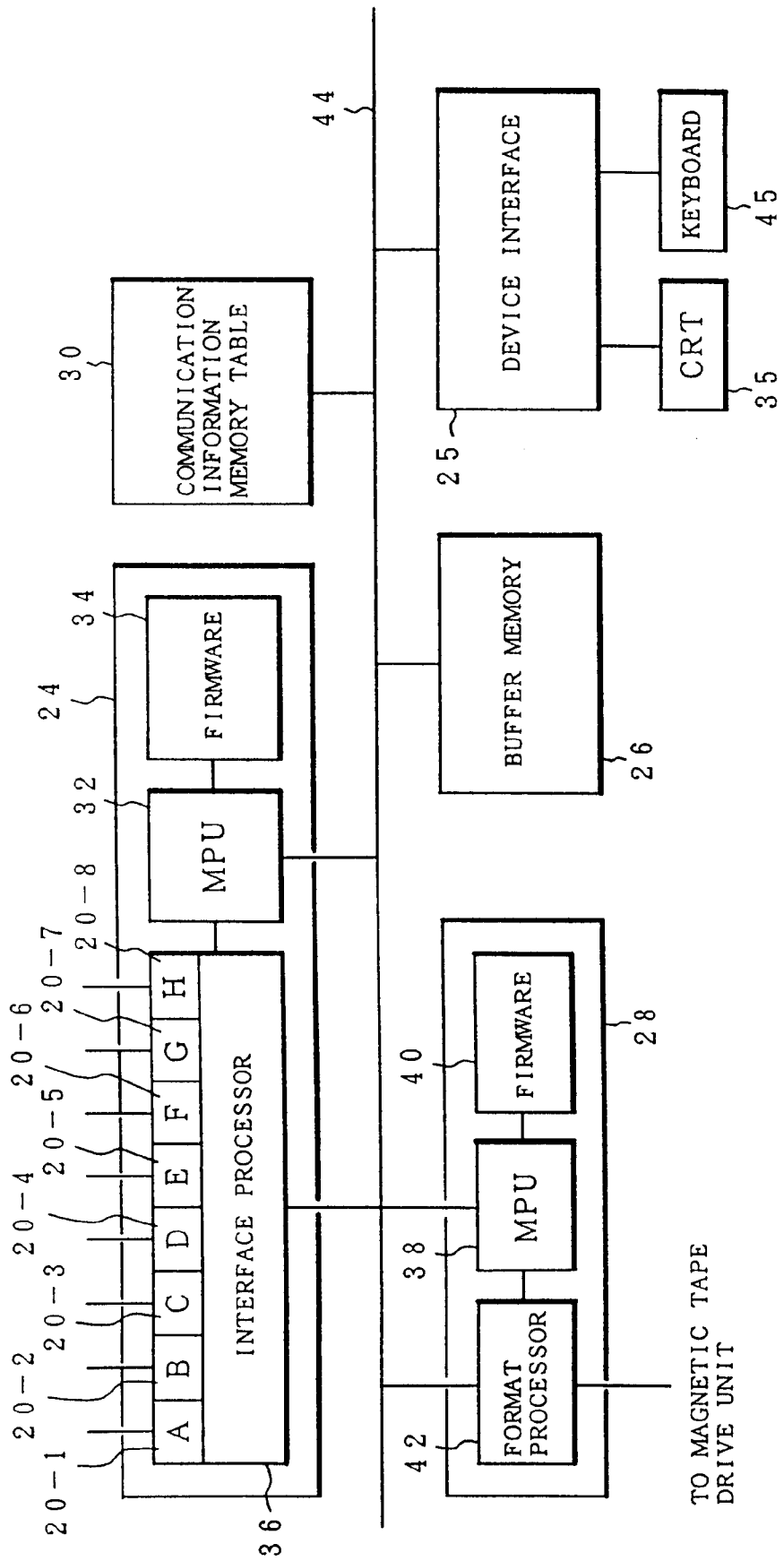
FIG. 5 is a block diagram of an input/output control unit of the invention.

FIG. 5 shows a hardware construction of the magnetic tape control unit 10 in FIG. 4. The magnetic tape control unit 10 is constructed by a host interface section 24, a buffer memory 26, a formatter section 28, and a communication information memory table 30. The host interface section 24 has an MPU 32, a firmware 34, and an interface processor 36. The ports (A to H) which are realized by the input/output port units 20-1 to 20-8 to which the channel buses from the host computers are connected are provided for the interface processor 36. An MPU 38, a firmware 40, and a format processor 42 are provided for the formatter section 28. Input/output controls of the invention are executed by the MPU 32, firmware 34, and interface processor 36 provided for the host interface section 24. Data which is transmitted and received between the host computers and the magnetic tape drive units is temporarily stored in the buffer memory 26. By the data transfer via the buffer memory 26, the transfer between the I/O control unit 10 and the channel and the transfer between the I/O control unit 10 and the magnetic tape drive unit side are asynchronously executed. When an activation request is received to any one of the ports (A to H) of the interface processor 36, the MPU 32 provided for the host interface section 24 accepts the activation request under a condition such that the other ports are not coupled, couples with the channel bus, and executes a transferring process of a channel command word based on an input/output request from the host computer. The channel command generally includes a command chaining as continuous different command words to realize a series of command sequences and a data chaining to repetitively transfer a read command or a write command in order to transfer the data on a block unit basis. Each time the data transfer by the channel command is executed once, the channel unit generates a start I/O request (start I/O command) to the corresponding port of the magnetic tape control unit 10, thereby executing an activation request. At the time of the activation request, any one of the drive IDs #1 to #8 of the magnetic tape drive units is ordinarily designated. The interface processor 36 monitors the start I/O requests from the channel buses to the ports (A to H). When the start I/O request is recognized, the interface processor 36 returns a coupling completion response indicative of a normal end for the start I/O command under a condition such that the other ports are not coupled. In the case where another port is being coupled when the start I/O request is received, the interface processor 36 fundamentally returns a busy response. The MPU 32 decodes the command from the channel side received through the interface processor 36 and writes various kinds of information such as parameters and the like which are necessary to control the magnetic tape drive units into the communication information memory table 30. The data transferred to write to the magnetic tape drive units is written into the buffer memory 26. The MPU 38 of the formatter section 28 cyclically refers to the communication information memory table 30 asynchronously with the MPU 32. When the information necessary for the control of the magnetic tape drive units or the data transfer is recognized, the MPU 38 instructs a processing operation for various kinds of controls and the data transfer for the magnetic tape drive unit having the designated drive ID via the format processor 42. The MPU 38 cyclically detects states of the magnetic tape drive units 12-1 to 12-8 and writes the detection results into the communication information memory table 30. Therefore, when a sense command to confirm the states of the magnetic tape drive units is received by the host interface section 24 from the channel side, the MPU 32 recognizes the states of the magnetic tape drive units by referring to the communication information memory table 30 and can respond to a status command. Further, a function as a compressing and expanding section for compressing the transfer data from the channel bus, for thereafter writing the compressed transfer data into the buffer memory 26, for expanding the compressed read data read out from the magnetic tape drive unit to the buffer memory 26 to the original data, and for sending the expanded original data to the channel bus is provided for the interface processor 36. As for the data compressing and expanding process, whether the data is expanded or compressed or is processed as it is can be designated by a bit flag of a set command which is sent at the first of a read or write request. On the other hand, a CRT 35 and a keyboard 45 are provided as optional devices through a device interface 25. The operator, consequently, can set various kinds of parameters necessary for the input/output controls of the MPU 32 of the host interface section 24 from the outside. Control parameters of the MPU 32 can be also set by using a CRT and a keyboard on the host computer side.

[Learning Process]

Figure 6:
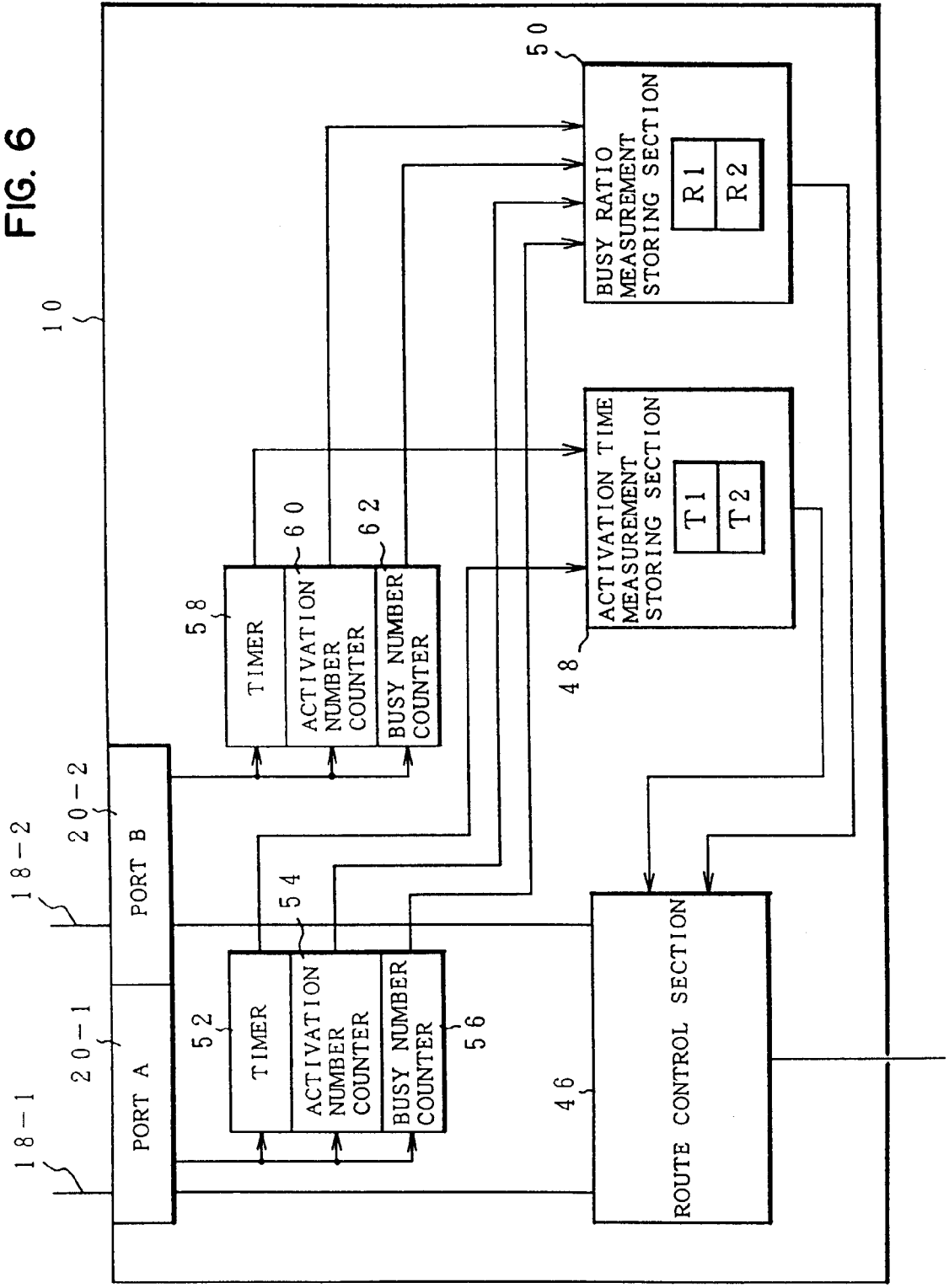
FIG. 6 is a block diagram of the first form of the invention.

FIG. 6 shows an embodiment of the first form of the invention and relates to an example in the case where two ports (A and B) are provided for the magnetic tape control unit 10. A route control section 46 is provided for the magnetic tape control unit 10 and functions as a channel switch to select either one of the ports on the basis of an activation request from the channel bus to the port (A) or port (B). Timers 52 and 58 are provided for the ports (A and B), respectively. The timers 52 and 58 are activated when a busy end is responded to the channel buses from the ports (A and B) and are stopped when the activation requests are received from the channel buses after that. More accurately speaking, the activation time which is measured by each of the timers 52 and 58 is a time from a time point when the busy end is responded in association with the end of the coupling of the other ports after the busy response was performed to the channel bus to a time point when the activation request from the channel in a busy cancellation waiting state which received the busy end is received by the port. Therefore, the activation time itself shows a time at which the channel receives a unit end in the busy cancellation waiting state and again generates an activation request. The activation time depends on a transfer speed of the channel bus. The port (A) is a low speed port connected to the low speed channel bus 18-1. The port (B) is a high speed port connected to the high speed channel bus 18-2. Therefore, an activation time T1 of the low speed port (A) which is measured by the timer 52 is longer than an activation time T2 of the high speed port (B) which is measured by the timer 58. An activation time measurement storing section 48 stores the activation time T1 of the low speed port (A) and the activation time T2 of the high speed port (B) which were measured by the timers 52 and 58. Further, a busy ratio measurement storing section 50 is provided for the magnetic tape control unit 10. The busy ratio measurement storing section 50 calculates and stores busy ratios R1 and R2 every ports (A and B) by using count values of an activation number counter 54 and a busy number counter 56 provided for the port (A) and count values of an activation number counter 60 and a busy number counter 62 provided for the port (B), respectively. For example, when considering the port (A), the activation number counter 54 is counted up each time there is an activation request from the channel bus 18-1 to the port (A) and its count value indicates the total number of activation requests during the operation for the port (A). The busy number counter 56 counts the number of times of the busy response executed by the other port (B) which has already been coupled among the activation requests to the port (A). Each time the activation number counter 54 counts up, namely, whenever there is an activation request, the busy ratio measurement storing section 50 divides the count value of the busy number counter 56 by the count value of the activation number counter 54, thereby calculating the busy ratio R1 of the port (A). This point shall also similarly apply to the activation number counter 60 and busy number counter 62 of the port (B). Each time the activation request is received, the value of the busy number counter 62 is divided by the value of the activation number counter 60, thereby calculating the busy ratio R2 of the port (B) and storing. Further, the activation time measurement storing section 48 doesn't store the activation times T1 and T2 of the ports (A and B) measured by the timers 52 and 58 as they are but stores them separately with respect to a maximum time Tmax, a minimum time Tmin, and an average time Tav because the activation time differs in dependence on a situation at that time. When storing the maximum time Tmax, the maximum time Tmax obtained until the preceding time is compared with an activation time (T) obtained at this time. When the activation time (T) is larger, the maximum time Tmax so far is updated. When the activation time (T) is smaller, the maximum time Tmax so far is left. The minimum time Tmin is also updated in a manner similar to that mentioned above. The average time Tav can be obtained by dividing the sum of the activation times until the present time point by the number of activation request times. When the sum of all of the activation times is obtained, since a data bit length is too long, it is desirable to calculate a moving average of every predetermined number of activation times. When the activation request is received to the high speed port (B), the route control section 46 doesn't immediately performs a coupling completion response even when the port (A) is in a non-coupling state but compares the busy ratios R1 and R2 of the ports (A and B) and executes a route control so as to equalize the busy ratios R1 and R2 with reference to the busy ratio measurement storing section 50. Generally, the busy ratio R1 on the low speed port (A) side is large and the busy ratio R2 of the high speed port (B) is small. Therefore, the activation time T1 of the low speed port (A) of a large busy ratio is read out from the activation time measurement storing section 48. For the activation time T1 of the low speed port (A) which was read out, the port (B) sets a waiting time of the activation request to the low speed port (A). When there is an activation request to the low speed port (A) for the waiting time T1 of the activation request to the port (A), the route control section 46 couples the port (A) to the channel bus 18-1 and executes the transferring process and returns the busy response to the high speed port (B) to which the activation request has already been performed. Thus, the low speed port (A) side of the high busy ratio preferentially accepts the activation request and can almost equalize the busy ratio with that of the high speed port (B). Since the maximum time Tmax, average time Tav, and minimum time Tmin have been stored into the activation time measurement storing section 48 as an activation time T1 of the low speed port (A), the waiting time of the activation request for the low speed port (A) is set as follows, for example, from the relation between the busy ratios R1 and R2 of the ports (A and B).

I. When R1>R2, the maximum time Tmax is set to the waiting time.

II. When R1=R2, the average time Tav is set to the waiting time.

III. When R1<R2, the minimum time Tmin is set to the waiting time.

Figure 7:
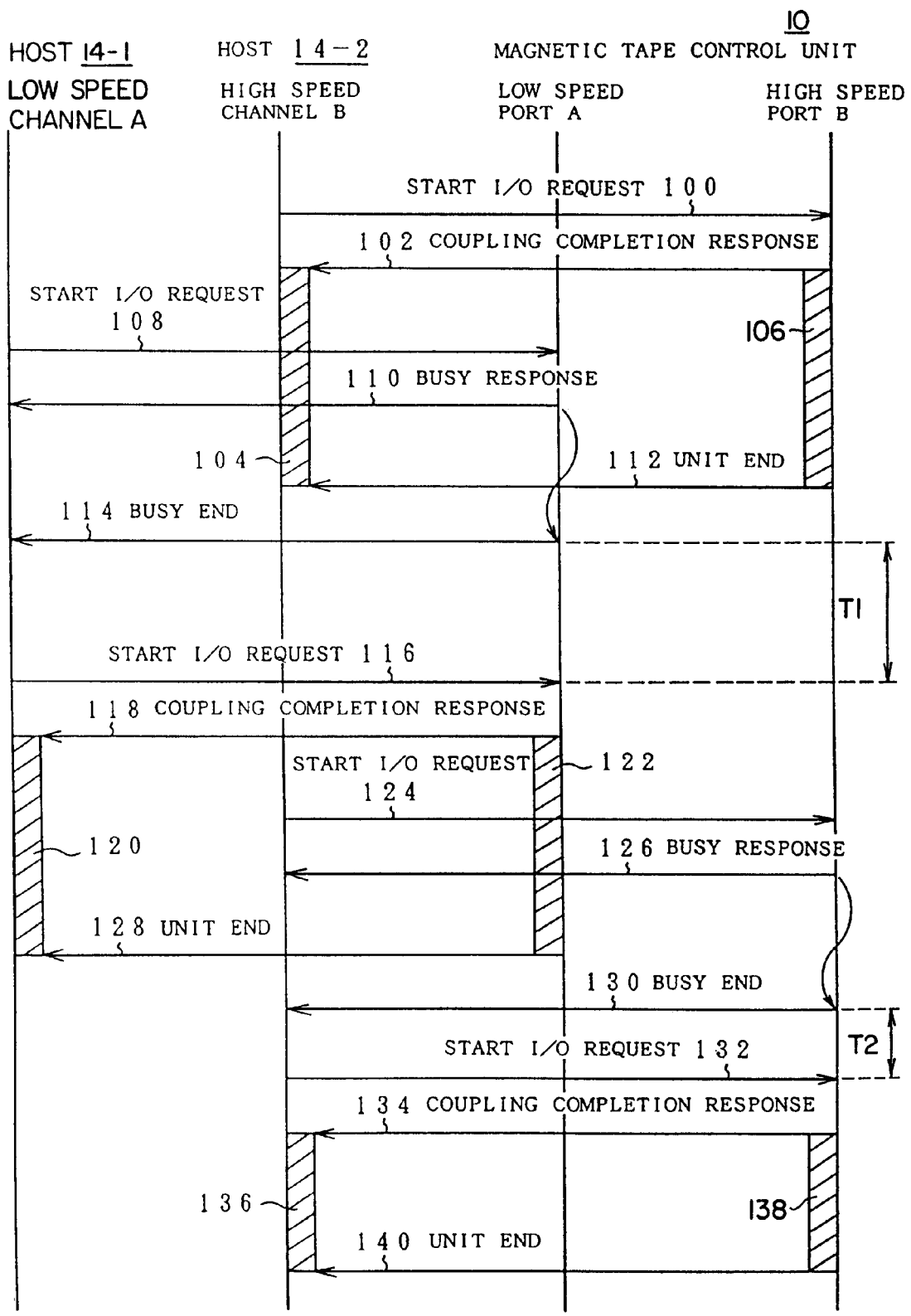
FIG. 7 is a time chart for a process to measure an activation time in FIG. 6.

FIG. 7 is a time chart for an activation time measuring process in FIG. 6. Now, when the host computer 14-2 generates a start I/O request 100 to the port (B), since the port (A) is not used in this instance, a coupling completion response 102 indicative of the normal end is returned and the channel (B) and port (B) execute transferring processes 104 and 106. Now, assuming that a start I/O request 108 is generated from the low speed channel (A) for periods of time of the transferring processes 104 and 106, a busy response 110 is returned from the low speed port (A). After completion of the transferring process, a unit end 112 is reported from the high speed port (B) to the high speed channel (B). Subsequently, a busy end 114 is outputted from the low speed port (A) to the low speed channel (A) in the busy cancellation waiting state. In response to the busy end 114, the low speed channel (A) recognizes the busy cancellation and generates a start I/O request 116. The timer 58 in FIG. 6 measures the time T1 from the response of the busy end 114 at the low speed port (A) to the reception of the start I/O request 116 as an activation time. The low speed port (A) which received the start I/O request 116 generates a coupling completion response 118 indicative of the normal end. Transferring processes 120 and 122 are executed at the low speed channel (A) and low speed port (A). Now, assuming that a start I/O request 124 is generated from the high speed channel (B) for periods of time of the transferring processes 120 and 122, a busy response 126 is returned from the high speed port (B). After completion of the transferring process, a unit end 128 is reported from the low speed port (A) to the low speed channel (A). Subsequently, a busy end 130 is outputted from the high speed port (B) to the high speed channel (B) in the busy cancellation waiting state. In response to the busy end 130, the high speed channel (B) recognizes the busy cancellation and generates a start I/O request 132. The timer 58 in FIG. 6 measures a time T2 from the response of the busy end 130 at the high speed port (B) to the reception of the start I/O request 132 as an activation time.

Figure 8:
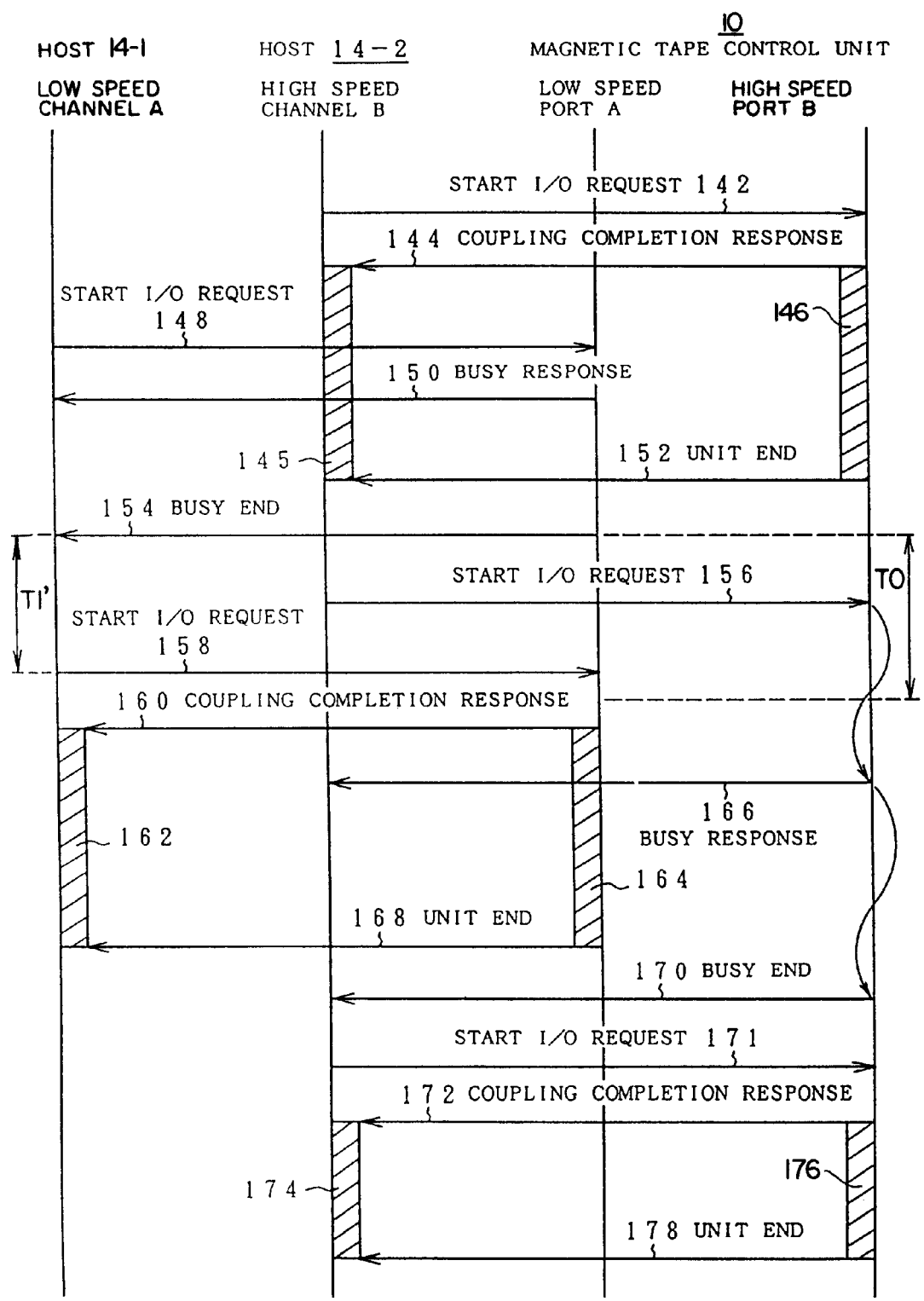
FIG. 8 is a time chart for an input/output process in FIG. 6.

FIG. 8 shows input/output controls by the route control section 46 using a storage time of the activation time measurement storing section 48 in FIG. 6. Now, assuming that a start I/O request 142 is generated from the high speed channel (B) to the high speed port (B) and there is a start I/O request 148 from the low speed channel (A) for periods of time during which transferring processes 145 and 146 are executed by a coupling completion response 144, a busy response 150 is executed. When the transferring processes 145 and 146 are finished in the busy cancellation waiting state of the low speed channel (A) and a unit end 152 is outputted and a busy end 154 is generated from the low speed port (A) in association with it, the waiting time (T) based on the activation time T1 is set. For a waiting time T0, a start I/O request 156 is first executed from the high speed channel (B) to the high speed port (B). However, since such a request is performed in the waiting time T0, the start I/O request 156 is not accepted but is waited. Subsequently, the low speed channel (A) generates a start I/O request 158 after the elapse of a time T1' from the reception of the busy end 154. In this instance, the magnetic tape control unit 10 lies within the waiting time (T) during which the activation request to the low speed port (A) is preferentially performed by the setting of the waiting time (T), the control unit 10 accepts the start I/O request 158 and returns a coupling completion response 160 and executes transferring processes 162 and 164. Subsequently, a busy response 166 to the start I/O request 156 is returned from the high speed port (B) to the high speed channel (A). After completion of the transferring processes 162 and 164, a unit end 168 is generated and a busy end 170 is also generated. Transferring processes 174 and 176 by the coupling of the high speed channel (B) and high speed port (B) are executed. As mentioned above, when the activation request to the high speed port (B) is accepted, the waiting time (T) over the activation time on the low speed port (A) side is provided and the activation request to the low speed port (A) is preferentially processed. Even if the activation request to the high speed port (B) continues, so long as there is an activation request to the low speed port (A), it can be normally accepted and processed. A situation such that the services are one-sided to the high speed port (B) side can be prevented.

Figure 9:
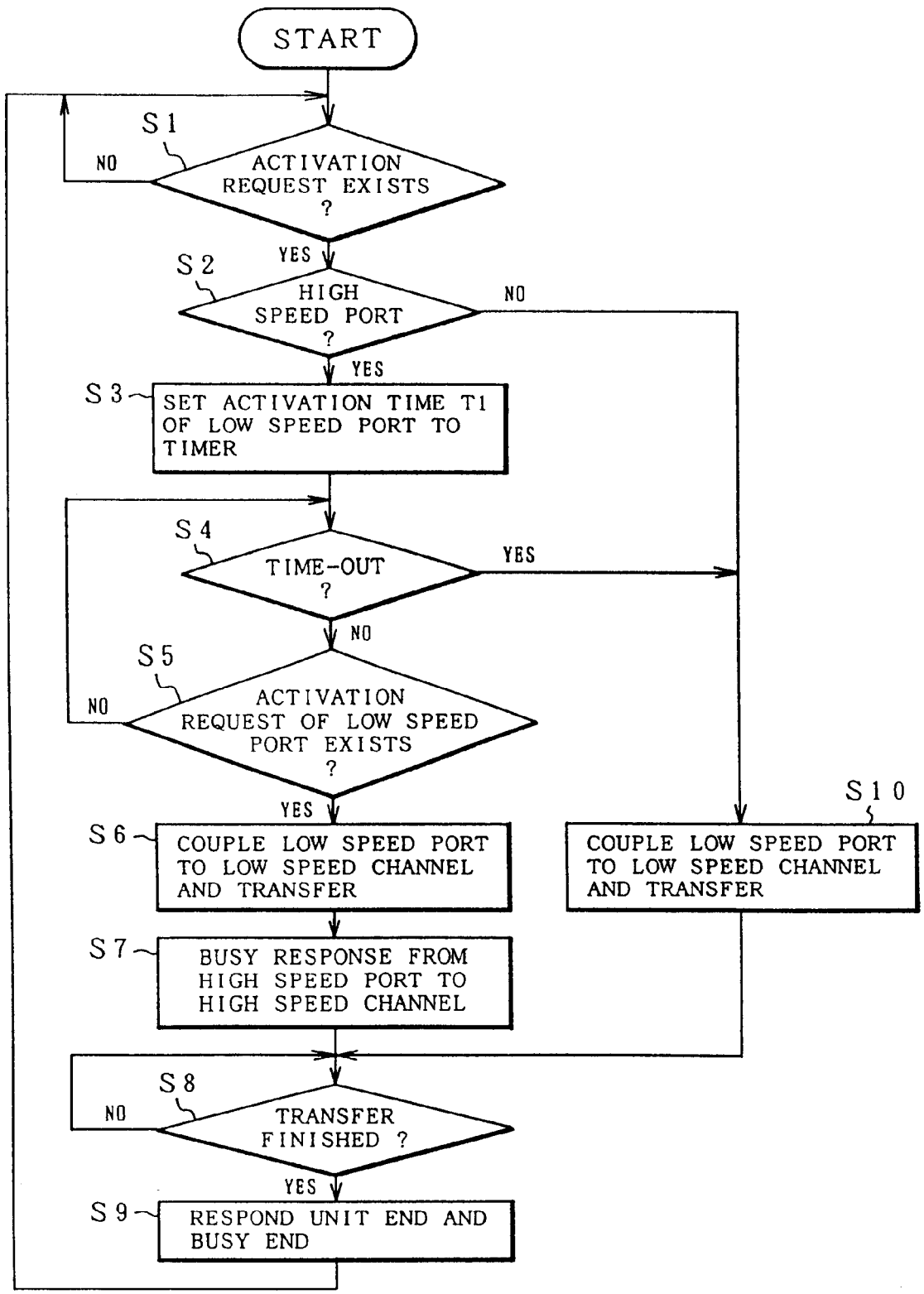
FIG. 9 is a flowchart for the input/output process in FIG. 6.

A flowchart of FIG. 9 relates to an input/output control process using the activation times and busy ratios in FIG. 6. When there is an activation request in step S1, the processing routine advances to step S2 and a check is made to see if the port is the high speed port or not. If YES, step S3 follows. For example, the activation time T1 measured at the low speed port is set as a waiting time (T) into the timer. Until the activation time T1 times out in step S4, the activation request to the low speed port is checked in step S5. When it is judged in step S5 that there is an activation request at the low speed port for the activation time T1, step S6 follows and the low speed port is coupled to the low speed channel and the transferring process is started. At the same time, a busy response is performed from the high speed port to the high speed channel in step S7. When the completion of the transferring processes on the low speed side is judged in step S8, a unit end is outputted from the low speed port in step S9 and the next busy end is outputted from the high speed port. Therefore, the activation request is again performed from the high speed port in the busy cancellation waiting state. The processing routine is again returned to the process in step S1. When the activation request from the low speed port is judged in step S2, step S10 follows and the low speed port is coupled to the channel and the transfer control is executed under a condition such that the high speed port is not coupled. If the high speed port has been coupled, there are executed ordinary processes such that a control unit end is responded from the low speed port and the apparatus waits for the response of the control unit end by the end of the coupling of the high speed port and the activation request is again executed to the low speed port.

Figure 10:
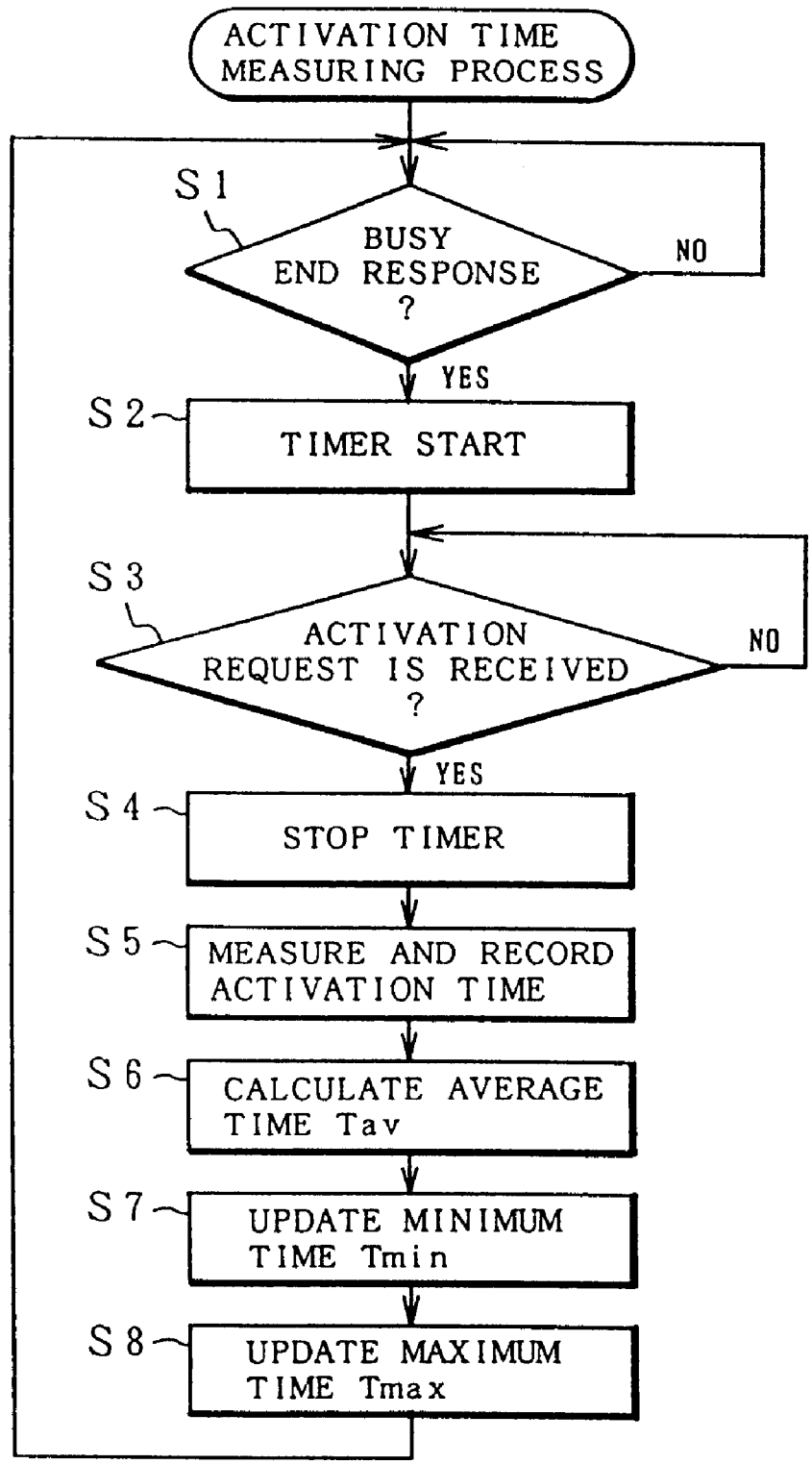
FIG. 10 is a flowchart for a process to measure the activation time in FIG. 6.

A flowchart of FIG. 10 relates to the processing operation of the activation time measurement storing section 48 in FIG. 6. The processing operation is independently executed every port (A or B). For example, in case of the port (A), a check is made in step S1 to see if there is a busy end response or not. If YES, the timer is started in step S2. In step S3, a check is made to see if an activation request to the port (A) has been received or not. When the activation request is received, step S4 follows and the timer activated in step S2 is stopped. In step S5, the time held in the timer is fetched as an activation time and stored. In step S6, the average time Tav including the activation time measured at this time is calculated. When a condition of the minimum time is satisfied, the present minimum time Tmin is updated in step S7. When a condition of the maximum time is satisfied, the maximum time Tmax is updated in step S8.

Figure 11:
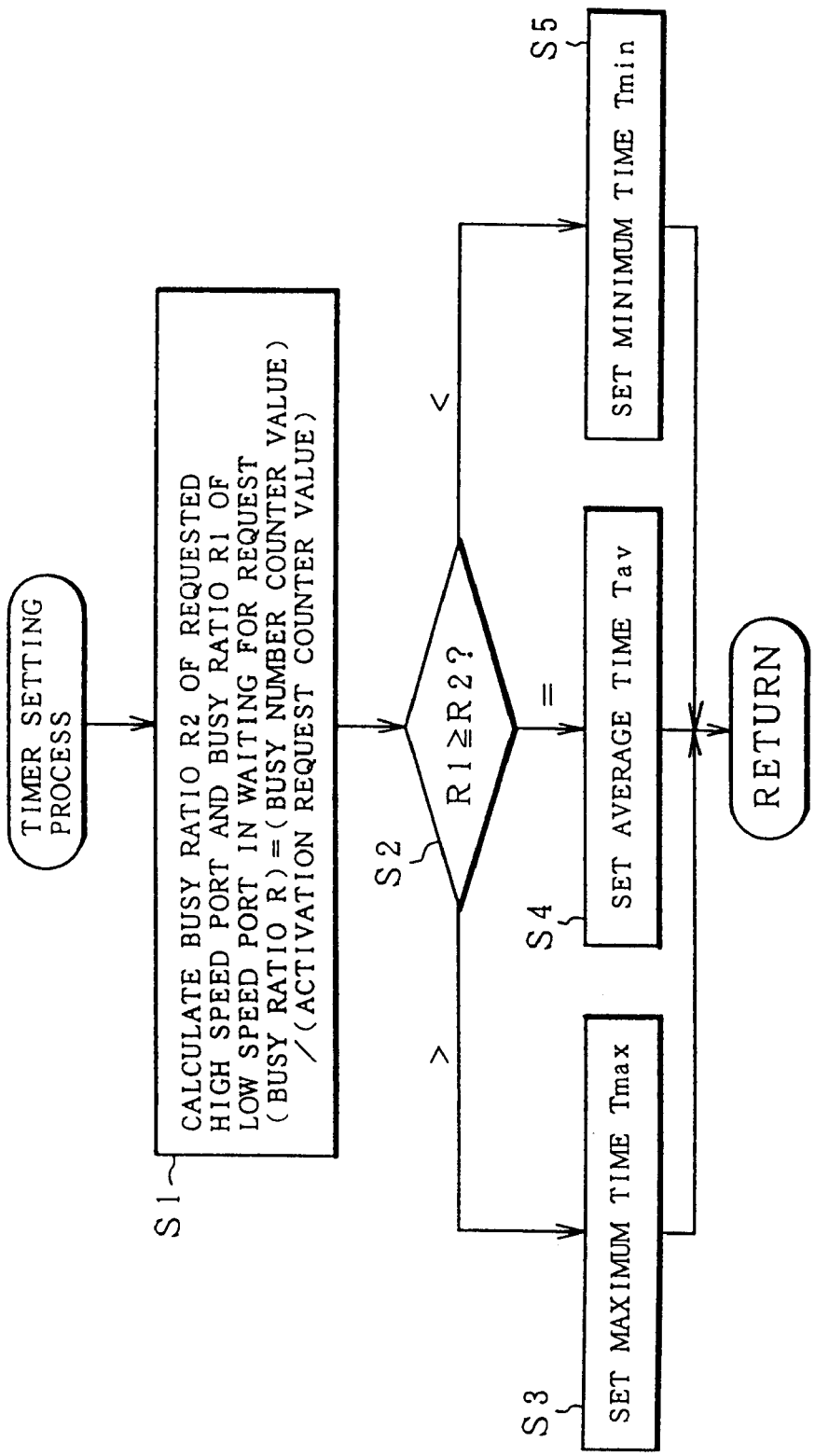
FIG. 11 is a flowchart for a process to set a waiting time timer in FIG. 6.

A flowchart of FIG. 11 shows the details when the activation time T1 of the low speed port is set to the timer in step S3 in FIG. 9. First in step S1, the busy ratio R2 of the high speed port (B) which received the activation request and the busy ratio R1 of the low speed port (A) in the waiting state of the request are calculated. The busy ratios R1 and R2 are set to the values which were obtained by dividing the count values of the busy number counters 56 and 62 provided for the ports (A and B) in FIG. 6 by the count values of the activation number counters 54 and 60 and which were stored in the busy ratio measurement storing section 50. Subsequently in step S2, a check is made to see if the busy ratio R1 of the low speed port (A) is equal to or larger than the busy ratio R2 of the high speed port (B) or not. When the busy ratio R1 of the low speed port is larger than the busy ratio R2 of the high speed port, step S3 follows and the maximum time Tmax in the activation time of the low speed port (A) stored in the activation time measurement storing section 48 is set as a waiting time. When the busy ratio R1 of the low speed port is equal to the busy ratio R2 of the high speed port, the average time Tav of the activation time of the low speed port is set to a waiting time in step S4. Further, when the busy ratio R1 of the low speed port is smaller than the busy ratio R2 of the high speed port, step S5 follows and the minimum time Tmin in the activation time of the low speed port is set to the waiting time. The invention is not limited to a method of setting the activation time to the waiting time on the basis of the busy ratios of the high and low speed ports in FIG. 11 but any other proper method of deciding the waiting time so as to almost equalize the busy ratio of the high speed port with the busy ratio of the low speed port can be also used. For example, it is also possible to use only the average time Tav as an activation time of the low speed port and to obtain the time in which the average time is multiplied with a predetermined weight coefficient and to set such a time in place of the maximum time or minimum time in steps S3 or S5.

Figure 12:
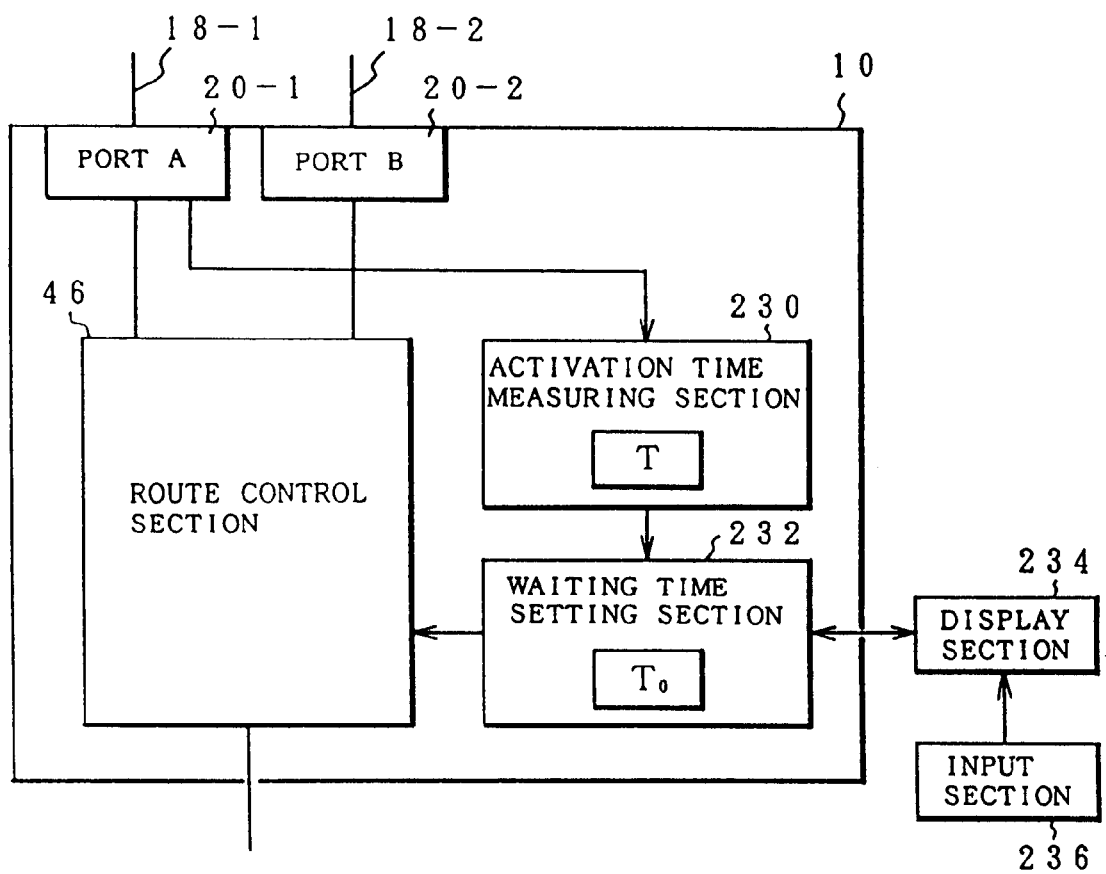
FIG. 12 is a block diagram of a modification of the first form of the invention.

FIG. 12 shows a modified embodiment of the first form of the invention. This modification is characterized in that at the time of the unit end of the high speed port (B), the activation time (T) from a time point when a busy end is responded from the low speed port (A) to the low speed channel (A) to a time point when the activation request is received is measured, and the activation request from the high speed channel (B) to the high speed port (B) after that is waited for the measured activation time (T), and the processing request from the low speed channel (A) to the low speed port (A) is accepted for such a waiting time.

In FIG. 12, an activation time measuring section 230 is provided for the low speed port (A). In a manner similar to the time chart of FIG. 7, the activation time measuring section 230 measures the activation time (T) from a time point when the busy end is responded to the low speed channel (A) from the low speed port (A) to a time point when the start I/O request (activation request) is received. On the basis of the measured time (T) measured by the activation time measuring section 230, a waiting time deciding section 232 sets the waiting time T0 in the route control section 46. The waiting time T0 can be also set to the same time as the measured time (T). Or, the waiting time T0 can be also variably set in accordance with the measured time (T). Generally, when the actual waiting time T0 is set to be longer than the measured time (T), the services can be more effectively allocated to the low speed side. Therefore, the waiting time T0 in which the measured time (T) is multiplied with, for example, a predetermined coefficient (K) of 1 or more is variably set. Further, the waiting time T0 can be also set by the inputting operation of the operator. For this purpose, a display section 234 and an input section 236 are provided on the outside for the waiting time deciding section 232. Functions of the display section 234 and input section 236 are realized by the device interface 25, CRT 35, and keyboard 45 in FIG. 5. The operator reads out the present waiting time T0 set in the waiting time deciding section 232 and displays to the display section 234 by the operation of the input section 236 and inputs an arbitrary waiting time T0 and sets into the waiting time deciding section 232 in consideration of a busy state of each channel at that time and an operation style of the host computer. When responding a unit end by the end of the transfer of the high speed port (B), the route control section 46 generates a busy response even when there is an activation request to the high speed port (B), thereby waiting for the activation for the waiting time T0 that is given from the waiting time setting section 232. When there is an activation request to the low speed port (A) for such a waiting time T0, it is soon accepted and a transferring process is executed. When the waiting time T0 times out or the unit end is responded by the end of the transfer of the low speed port (A), a busy end is generated from the high speed port (B), thereby allowing the high speed channel to again generate the activation request and accepting it.

[Circulation Checking Process of Busy Response/Busy End]

Figure 13:
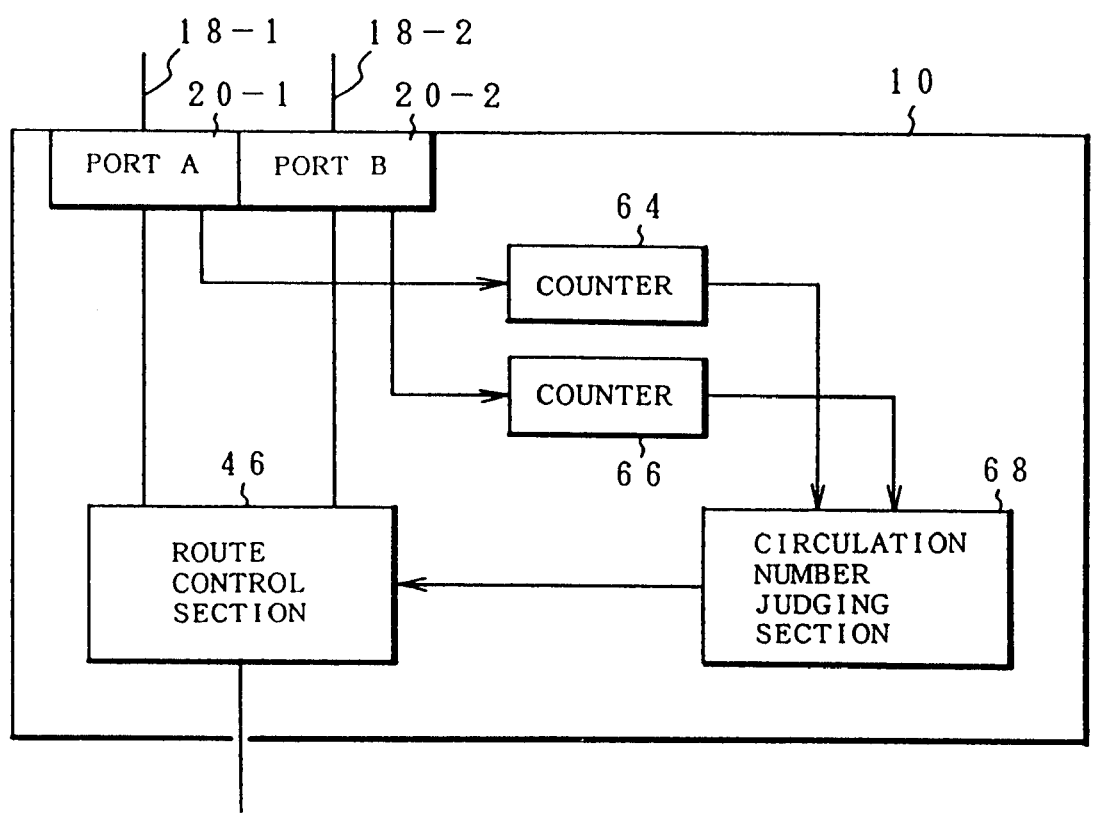
FIG. 13 is a block diagram of the second form of the invention.

FIG. 13 shows an embodiment of the second form of the invention. The embodiment is characterized in that a circulating state of a busy response and a busy end (busy cancellation response) such that by a continuous activation request at a high speed port, the low speed port side repeats a busy response for the activation request based on the busy end is detected and an acceptance of an input/output request is preferentially allocated to the low speed port. Counters 64 and 66 are provided for each of the low speed port (A) and high speed port (B) of the magnetic tape control unit 10. The counters 64 and 66 are counted up by "1" when the busy end is responded and a busy response for the activation request based on the responded busy end is executed. Namely, the counters 64 and 66 count up by detecting a circulation of one busy response and the busy end. A circulation number judging section 68 judges whether count values of the counters 64 and 66, namely, the number of circulating times of the busy response and the busy end have reached a predetermined value or not. When it is judged by the circulation number judging section 68 that the count value of the counter 64 or 66 has reached the predetermined value, by receiving such a judgment output, the route control section 46 controls so as to preferentially accept the activation request for the port (A) or (B) in which the number of circulating times exceeds the predetermined value.

Figure 14:
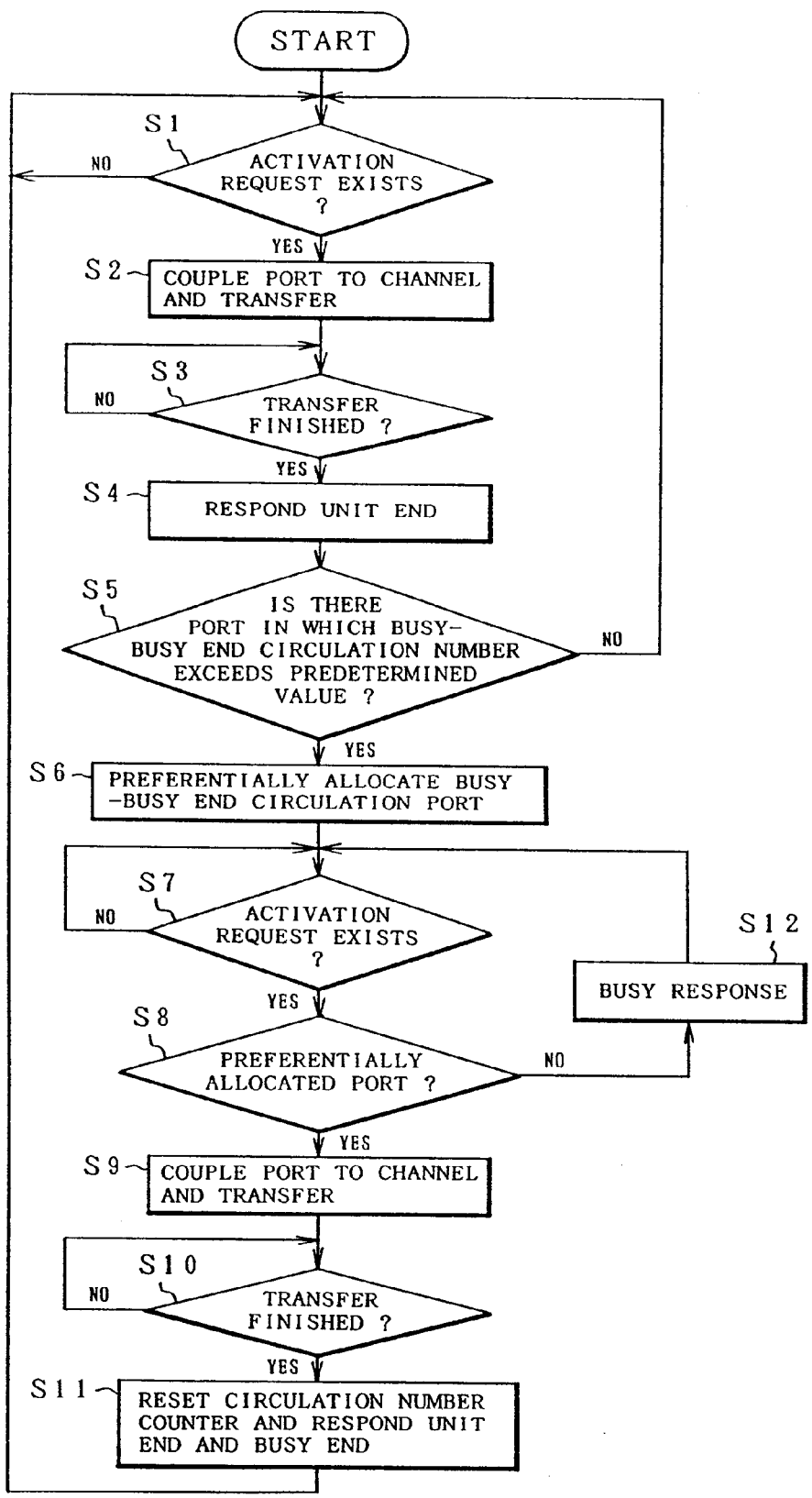
FIG. 14 is a flowchart for an input/output process in FIG. 13.

A flowchart of FIG. 14 relates to the processing operation in FIG. 13. First in step S1, the presence or absence of an activation request to the port (A) or (B) is discriminated. When there is an activation request, the port is coupled to the channel under a condition such that it is not being coupled to the other port, and the transferring process is executed. When the transferring process is finished in step S3, a unit end is responded in step S4. In this instance, when there is a port which performed a busy response, a busy end is responded from this port. Therefore, if the activation request was performed by the other port during the transfer by the coupling in step S2 and the busy response was executed, the corresponding counter in FIG. 13 counts up the number of circulating times of the busy response and the busy end by "1" by the busy end in step S4. In step S5, a check is made to see if there is a port in which the number of circulating times of the busy response and busy end exceeds a predetermined value or not. When there is a port in which the circulating number exceeds the predetermined value, step S6 follows and a preferential process of the activation request is allocated to the port in which the circulating number exceeds the predetermined value. In step S7, when the presence of the activation request is judged, a check is made in step S8 to see if the port is the port to which the preferential process was allocated or not. If NO, a busy response is returned in step S12. Thus, only the activation request for the preferential allocating port is accepted. The transferring process is executed by the coupling with the channel bus in step S9. After completion of the transferring process of the preferential allocating port in step S10, the circulation number counter provided for the preferential allocating port is reset in step S11 and a unit end is responded. In this instance, if there is another port in a waiting state by the busy response in step S12, a busy end is generated from such a port, thereby allowing the activation request to be generated.

[Time Sequential Process]

Figure 15:
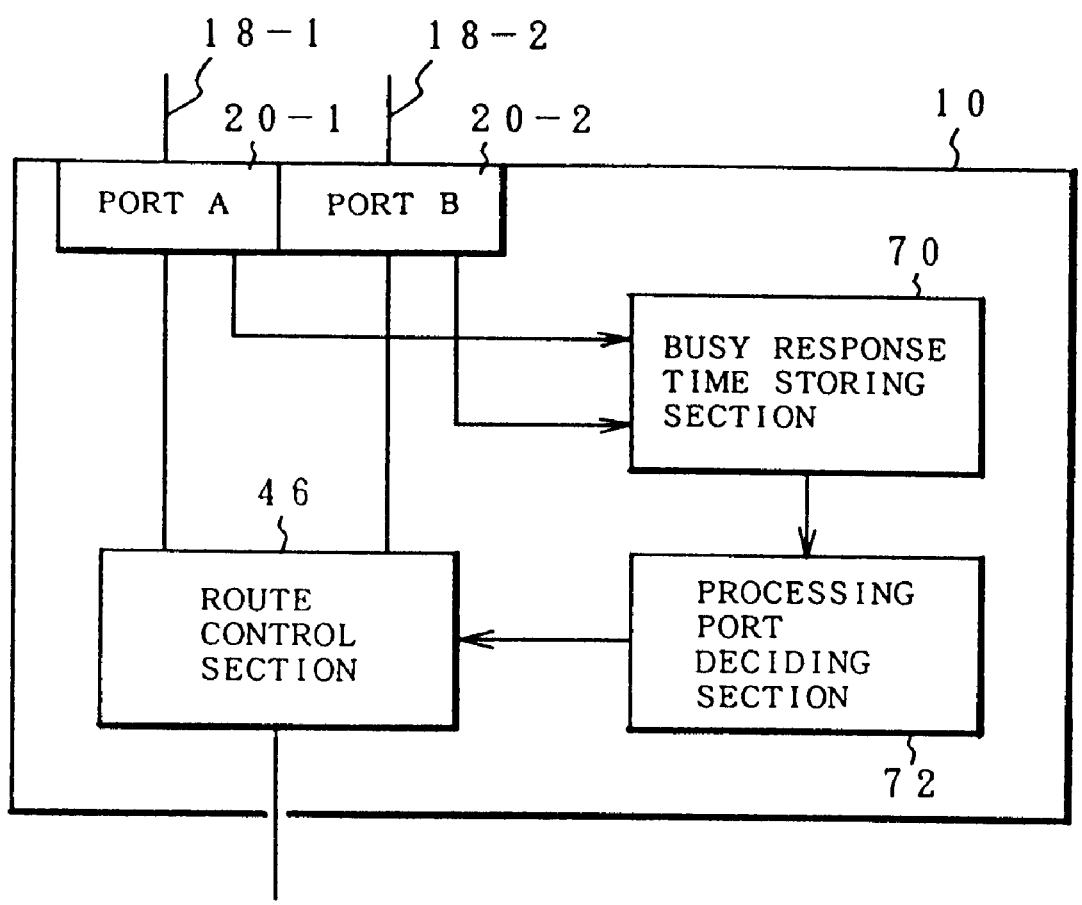
FIG. 15 is a block diagram of the third form of the invention.

FIG. 15 relates to an embodiment of the third form of the invention. The embodiment of the third form is characterized in that the time of a busy response of the other port is stored during the coupling of a certain port and, at the end of the coupling, services are preferentially allocated to the port of the oldest busy response time. In addition to the ports (A and B) and the route control section 46, a busy response time storing section 70 and a processing port deciding section 72 are provided for the magnetic tape control unit 10. During the coupling of the port (A or B), the busy response time storing section 70 stores the time at which the activation request was performed to the other port and the busy response was executed. Since there are two ports (A and B) in the embodiment, the response time of the port (B) is stored during the coupling of the port (A), while the response time of the port (A) is stored during the coupling of the port (B). When the transferring process of the port during the coupling is finished and the unit end response is performed, the processing port deciding section 72 refers to the busy response time storing section 70, decides the port having the oldest time among the busy response times stored as a port for subsequently preferentially processing the activation request, and notifies to the route control section 46. The route control section 46 preferentially processes the activation request from the port decided by the processing port deciding section 72. In the embodiment, since there are only the two ports (A and B), when the port (B) performs the busy response during the coupling of the port (A), the processing port deciding section 72 decides the port (B) as a port which subsequently preferentially accepts the activation request. The route control section 46 executes the busy response for the activation request from the port (A) and accepts only the activation request from the port (B). Thus, even if the port (A) is the low speed port and the port (B) is the high speed port, the route control section 46 can alternately accept the activation request for each of the continuous activation requests. The busy ratios of the low speed port (A) and high speed port (B) can be almost equalized. Actually, as shown in the system construction of FIG. 4, eight ports (A to H) are provided for the magnetic tape control unit 10. In this case, during the coupling of a certain port, if there is an activation request to any one of the remaining seven ports, the busy response time at that time is stored. When the present transferring process is finished and the unit end occurs, by generating the busy end from the port having the oldest time among a plurality of busy response times, the acceptance of the activation request is allocated.

Figure 16:
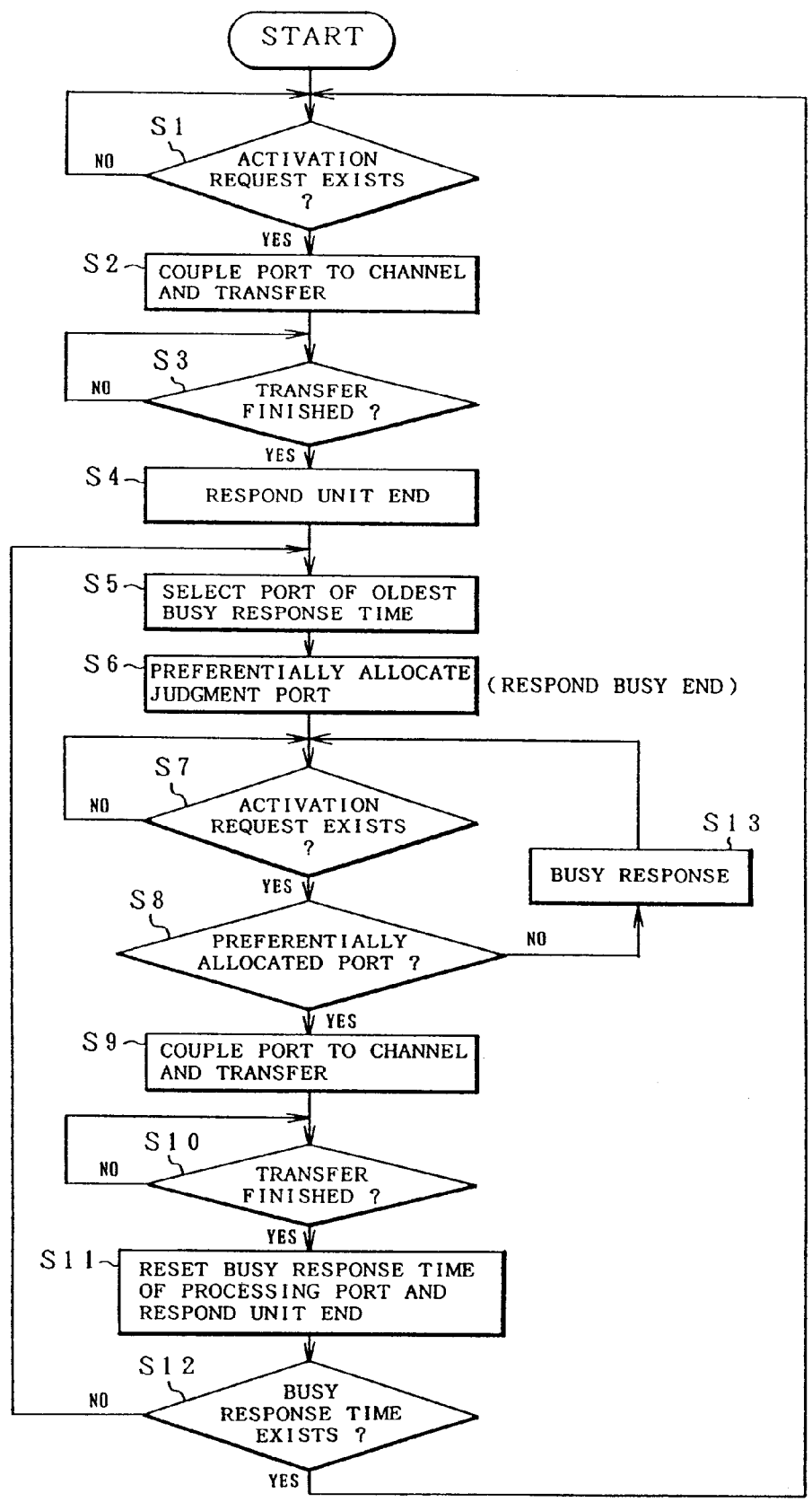
FIG. 16 is a flowchart for an input/output process in FIG. 15.

A flowchart of FIG. 16 relates to the processing operation of FIG. 15. In step S1, the presence or absence of an activation request for the plurality of ports is checked. When there is an activation request to a specific port, the port is coupled to the channel bus and the transferring process is executed in step S2. A check is made in step S3 to see if the transferring process has been finished or not. After completion of the transfer, a unit end is responded from the port during the coupling in step S4. In steps S1 to S4, during the coupling of a certain port, when there is an activation request from another port, the response time is stored in the busy response time storing section 70. After the unit end was responded, the port of the oldest time among the busy response times is determined as a processing port in step S5. A busy end is generated from the decided port in step S6. The busy cancellation waiting channel which received the busy end again generates the activation request. In step S7, the presence or absence of an activation request is discriminated. When there is an activation request, a check is made in step S8 to see if the port is a preferential allocating port or not. If NO, a busy response is returned in step S12. Thus, only the activation request for the preferential allocating port is accepted. In step S9, the port is coupled to the channel bus and the transferring process is executed. When the transferring process is finished in step S10, the busy response time of the processing port is reset and the unit end is responded in step S11. The processing routine is returned to step S13. If the record of the busy response times remains, the processing routine is again returned to step S5. The processes such that the port having the oldest time among the remaining busy response times is determined as a processing port and the busy end is generated are repeated. When no busy response time remains, the processing routine is again returned to step S1.

[Retry interrupting process 1]

Figure 17:
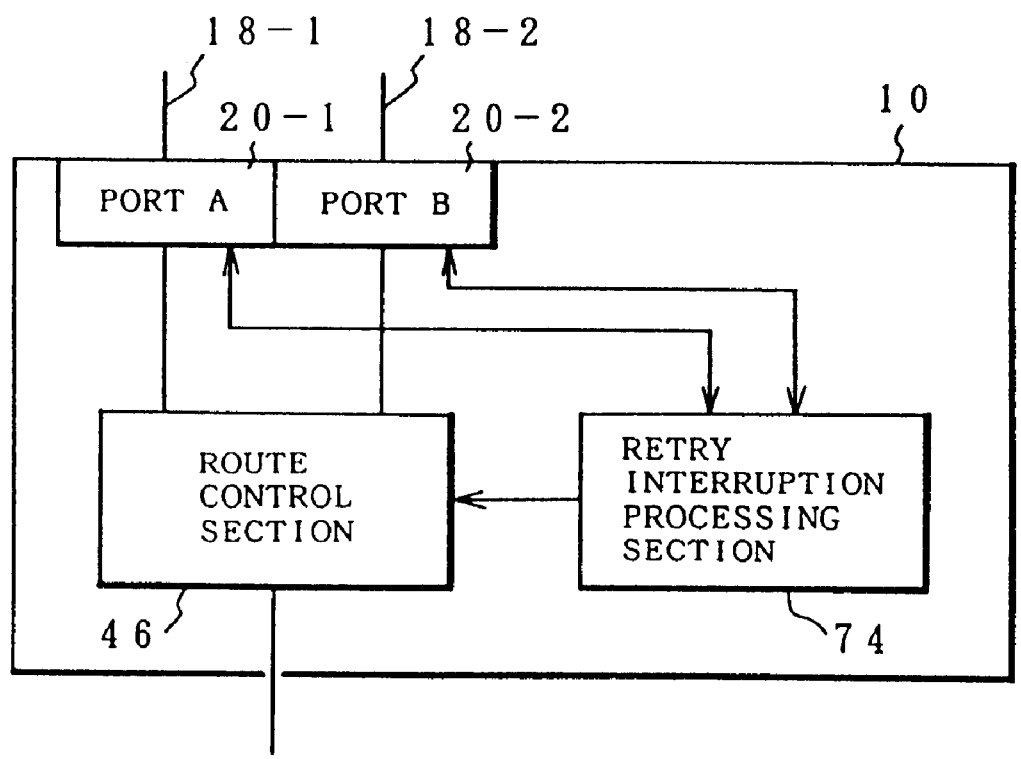
FIG. 17 is a block diagram of the fourth form of the invention.

FIG. 17 shows an embodiment of the fourth form of the invention. The embodiment of the fourth form is characterized in that during the coupling of a certain port with the channel, when the activation request comes to another port, in place of responding a busy, a status to request a retry of the channel operation is responded, and when the transferring process that is at present being executed is finished, an interruption request to start the retry is performed to the channel which responded a status of the retry request, and the port is again coupled. In addition to the ports (A and B) and the route control section 46, a retry interruption processing section 74 is provided for the magnetic tape control unit 10. For example, when the activation request comes to the port (B) during the coupling of the port (A), the retry interruption processing section 74 ordinarily has returned the busy response in the foregoing embodiments. However, in the fifth form, a status to request the retry of the channel operation is responded and the coupling with the channel bus of the port (B) is once disconnected. Subsequently, when the transferring process of the port (A) is finished and the unit end is responded, the interruption request of the retry start is executed to the channel (B) which responded the status of the retry request and the port is again coupled. The channel unit which received the response of the retry request status from the retry interruption processing section 74 enters a waiting state of the retry start of the channel operation. After that, when an interruption response to start the retry is received, a command sequence from the activation request is restarted and the port is again coupled.

By such processes of the retry interruption processing section 74, which port should be recoupled can be determined on the magnetic tape control unit 10 side and the average services can be provided to each port. For example, when the activation request of the high speed port (B) is continuous and there is the activation request to the low speed port (A) during the coupling of the high speed port (B), the retry interruption processing section 74 responds the retry request status and the low speed channel (A) side which performed the activation request to the low speed port (A) is set into a retry waiting state. When the transferring process of the high speed port (B) is finished and the unit end is responded, the retry interruption processing section 74 executes the interruption request to start the retry to the low speed channel (A) via the low speed port (A), the port is again coupled, the activation request is again generated from the low speed channel (A) which received the interruption of the retry start, and the transferring process is executed in accordance with a series of command sequence. Thus, even when the activation request continues on the high speed port (B) side, the activation request of the low speed port (A) which occurs during the coupling of the high speed port (B) is not eliminated as a busy response. The activation request of the low speed port (A) is forcedly accepted by the interruption. The average services can be provided to the low speed port (A) and high speed port (B).

Figure 18:
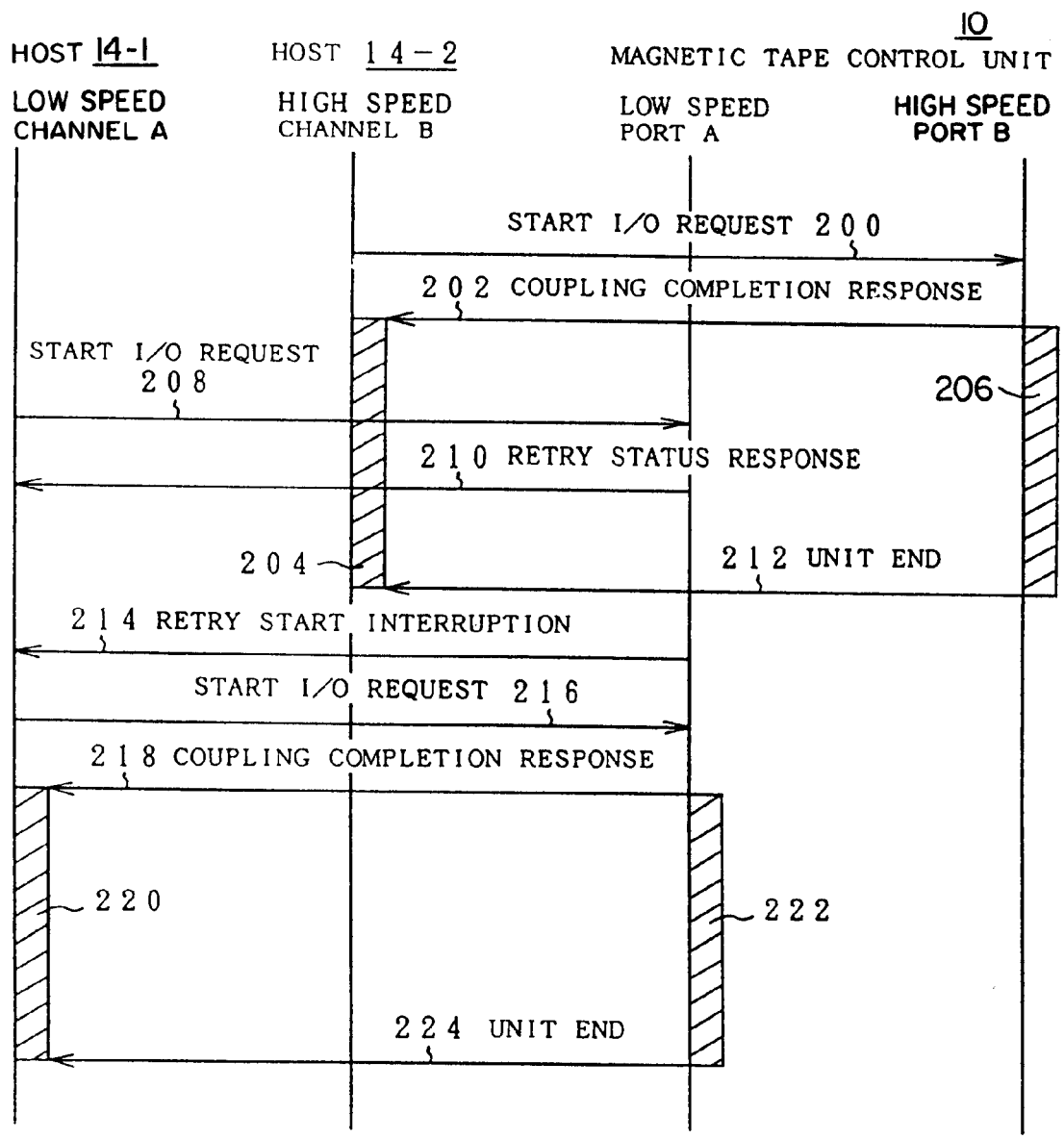
FIG. 18 is a time chart for an input/output process in FIG. 17.

FIG. 18 shows processes in the case where there is an activation request to the low speed port (A) during the coupling of the high speed port (B) in FIG. 17. First, when a start I/O request 200 is performed from the high speed channel (B) to the high speed port (B), a coupling completion response 202 is executed. After that, transferring processes 204 and 206 are executed. During the above transferring processes, when a start I/O request 208 is performed from the low speed channel (A) to the low speed port (A), a retry interruption status response 210 is executed and the low speed channel (A) enters a retry activation waiting state. When the transferring processes 204 and 206 are finished and a control unit end 212 is generated, a retry start interruption notification 214 is executed from the low speed port (A) to the low speed channel (A) in association with the control unit end 212. A start I/O request 216 is again generated from the low speed channel (A) in the retry start waiting state. On the other hand, a coupling completion response 218 is generated by the recoupling and transferring processes 220 and 222 are executed by the coupling between the low speed channel (A) and the low speed port (A). After completion of the transferring process, a control unit end 224 is generated.

Figure 19:
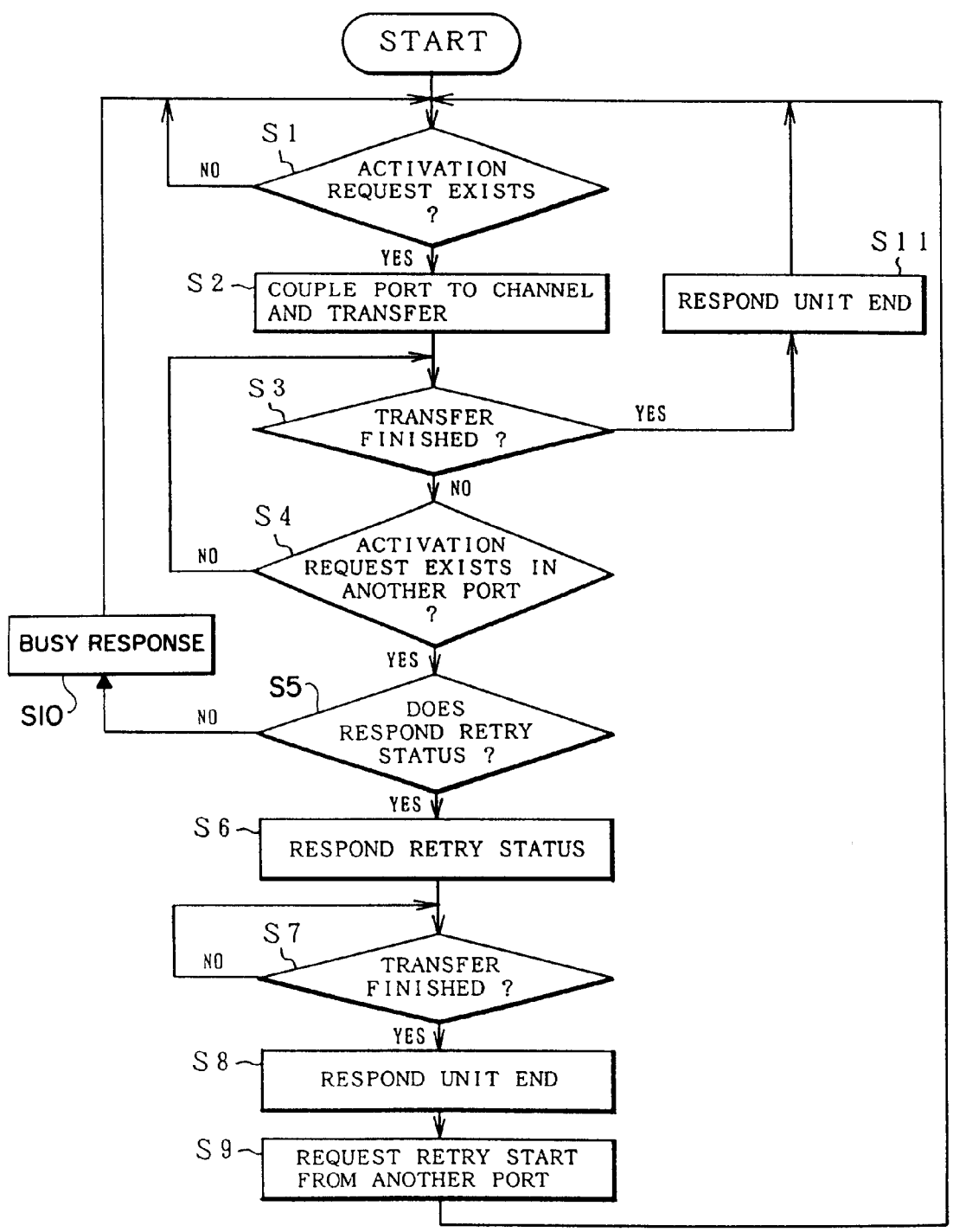
FIG. 19 is a flowchart for the input/output process in FIG. 17.

A flowchart of FIG. 19 relates to the processing operation of the embodiment of FIG. 17. First in step S1, the presence or absence of an activation request is checked. When there is an activation request to a specific port, step S2 follows. The port is coupled to the channel and the transferring process is executed under a condition such that the other port is not in the coupling state. During the transfer, until the end of transfer is judged in step S3, a check is made to see if there is an activation request to the other port or not in step S4. If there is an activation request, step S5 follows and a check is made to see if the retry status is responded to the channel unit which performed the activation request or not in step S5. When the port that is at present being coupled is the low speed port and the port which received the activation request during the coupling is the high speed port, since there is no need to preferentially process, a busy response is returned in step S7. On the other hand, when the port that is at present being coupled is the high speed port and the port which received the activation request during the coupling is the low speed port, it is necessary to preferentially process. Therefore, step S6 follows and the retry status is responded. When the end of transfer is judged in step S7, step S8 follows and a unit end is responded from the port in coupling. In step S9, a check is made to see if the retry status was responded during the transfer or not. If YES, the interruption request of the retry start is generated from the other port which responded the retry status in step S10. If no retry status is responded during the transfer, the unit end is responded from the other port which performed the busy response in step S11. The processing routine is returned to step S1. Although the embodiment of the fourth form mentioned above has been described with respect to the two ports comprising the low speed port (A) and the high speed port (B), as shown in FIG. 5, the invention can be also applied to the case of eight ports (A to H). When the number of ports is equal to 3 or more, since there is a case where during the coupling of a certain port, the interruption request is accepted by the plurality of other ports. Therefore, it is sufficient to allocate the priority to the retry interrupting process for the interruption request and to notify the interruption of the retry start in accordance with the priority.

[Retry Interrupting Process 2]

Figure 20:
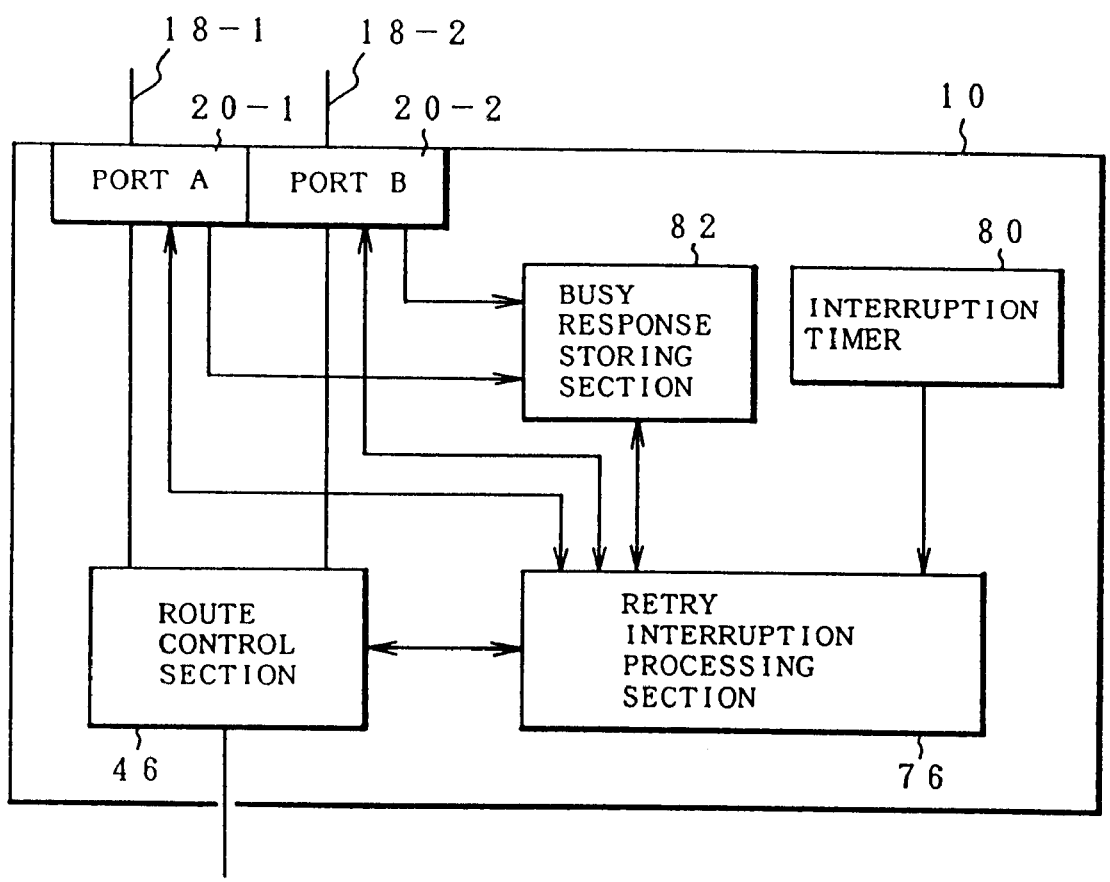
FIG. 20 is a block diagram of the fifth form of the invention.

FIG. 20 shows the first embodiment of the fifth form of the invention. In the fifth form, when a predetermined interruption condition is satisfied during the coupling of a certain port, a status of a retry request is responded to the channel from the port that is being coupled at present, thereby temporarily disconnecting. Subsequently, whether a situation of a busy response, for example, the newest busy response time and the number of busy response times are checked with respect to all of the ports or the interruption request is analyzed and the services to which port are preferentially executed is determined. A unit end is responded from the port in which the preferential process was decided, thereby preferentially executing the transferring process. After completion of the transferring process, an interruption request to start the retry is executed from the disconnected port and the port is again coupled. The process which was once interrupted is restarted.

The first embodiment of FIG. 10 is characterized in that the interruption is performed at a predetermined time interval as an interruption condition. In addition to the ports (A and B) and route control section 46, an interruption timer 80, a busy response storing section 82, and a retry interruption processing section 76 are provided for the magnetic tape control unit 10. The interruption timer 80 causes a timer output to the retry interruption processing section 76 at a predetermined time interval, thereby executing the interrupting process. As information indicative of busy states of the ports (A and B), for example, the time at which the newest busy response was performed and the number of busy response times are stored in the busy response storing section 82. The retry interruption processing section 76 starts the interrupting operation by the time-out of the interruption timer 80 during the coupling of, for example, the high speed port (B). A status of the retry request is responded to the high speed channel (B) from the high speed port (B) that is at present being coupled, thereby temporarily disconnecting. After the coupling with the high speed port (B) was disconnected, busy states of all of the ports, namely, the ports (A and B) stored in the busy response storing section 82, for example, the newest time of the busy response and the number of busy response times are referred, thereby determining whether the services to which port are preferentially performed. For example, since the processes with respect to the high speed port (B) are at present being executed, the busy time regarding the low speed port (A) as another port is the oldest time and the number of busy responses indicates a certain value, so that the retry interruption processing section 76 decides the low speed port (A) as a preferential processing port. When the processing port is decided, the retry interruption processing section 76 allows a unit end to be responded to the channel (A) from the decided processing port (A) through the route control section 46. By receiving the unit end from the port (A), the activation request is executed to the low speed port (A) from the low speed channel (A) in the waiting state by the busy response so far. The port (A) is effectively coupled and the transferring process is executed. When the transferring process on the low speed port (A) side is finished and the unit end is responded, the retry interruption processing section 76 interrupts the process and generates an interruption request for the retry start to the high speed channel (B) from the disconnected high speed port (B). By receiving the interruption request, the activation request is performed to the high speed port (B) from the high sped channel (B). The transferring process which was once interrupted is restarted. When the preferential process of the low speed port (A) is finished and the unit end is generated, the busy response time and the number of busy responses regarding the low speed port (A) in the busy response storing section 82 are reset at the same time.

Figure 21:
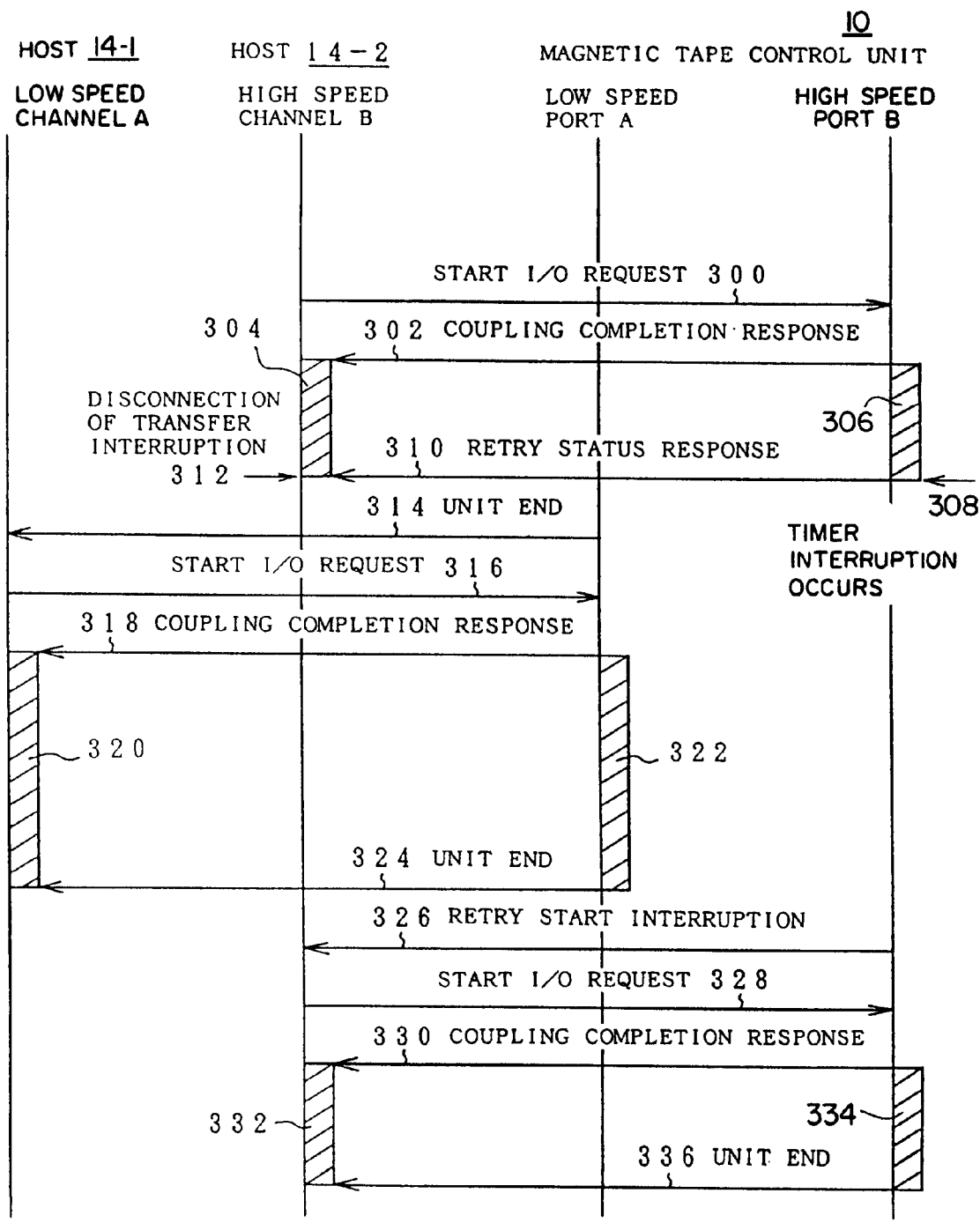
FIG. 21 is a time chart for an input/output process in FIG. 20.

A time chart of FIG. 21 relates to the operation of the retry processing section in FIG. 20. First, a start I/O request 300 is performed from the high speed channel (B) to the high speed port (B) and since the other low speed port (A) is not coupled, a coupling completion response 302 as a normal end is returned and the high speed channel (B) and high speed port (B) execute transferring processes 304 and 306.

When a timer interruption 308 due to the interruption timer occurs during the transferring processes, a retry status response 310 is generated from the high speed port (B) to the high speed channel (B), thereby disconnecting. After completion of the disconnection, states of the busy responses with respect to all of the ports (A and B) are discriminated. In this instance, when there is a busy response to the low speed port (A) side, the low speed port (A) is determined as a port to be preferentially processed. A unit end 314 is generated to the low speed channel (A) from the low speed port (A) of which the preferential process was decided, thereby allowing a start I/O request 316 to be generated from the low speed channel (A). The start I/O request 316 is normally received by the low speed port (A). After a coupling completion response 318 was returned, transferring processes 320 and 322 are executed between the low speed channel (A) and the low speed port (A). After the transferring processes were finished, a unit end 324 is responded from the low speed port (A). Subsequently, a retry start interruption notification 326 is sent to the high speed channel (B) from the high speed port (B) which was temporarily disconnected. Therefore, a start I/O request 328 is generated from the high speed channel (B) in the retry waiting state and is received by the high speed port (B). The processes are normally finished and a coupling completion response 330 is returned. The transferring processes which were temporarily interrupted are restarted as transferring processes 332 and 334. After completion of the restarted transferring processes, a unit end 336 is generated from the high speed port (B). As mentioned above, when the interruption condition is satisfied, by disconnecting the present coupling on the magnetic tape control unit side and deciding the port to be preferentially processed in accordance with the busy state and executing the transferring processes by interruption, even in the case where the activation request to the high speed port continues, the circulation of [busy-unit end] can be prevented on the low speed port side.

Figure 22:
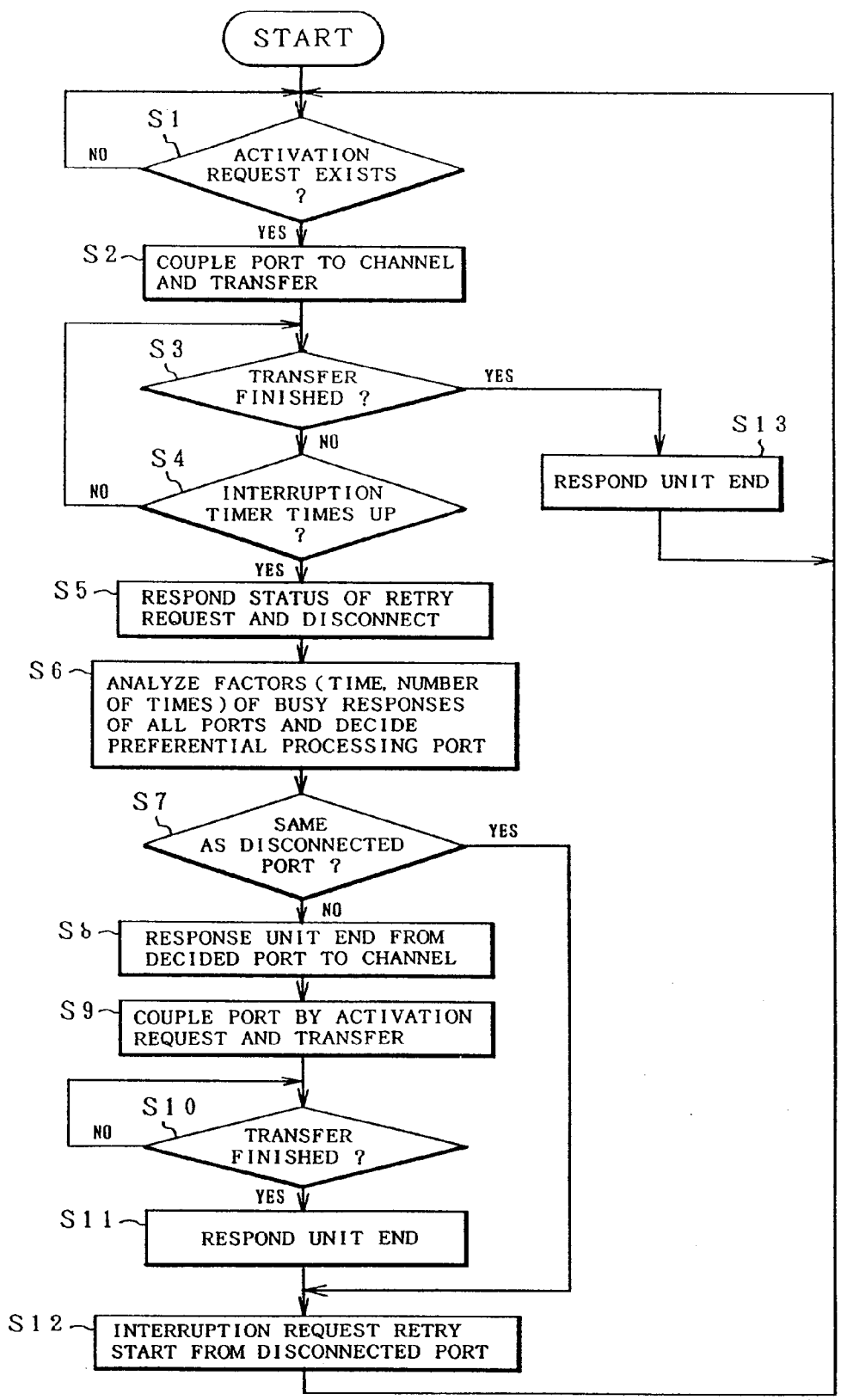
FIG. 22 is a flowchart for the input/output process in FIG. 20.

A flowchart of FIG. 22 relates to the retry interrupting process using the interruption timer in FIG. 19. First in step S1, the presence or absence of an activation request to each port is discriminated. When there is an activation request to a certain port, step S2 follows and the port is coupled with the channel and the transferring process is started under a condition such that it is not coupled with the other port. During the transfer, until the end of transfer is judged in step S3, the time-up of the interruption timer is monitored in step S4. When the interruption timer times up during the transfer, step S5 follows and a status response of the retry request is performed form the port that is at present being coupled, thereby disconnecting. In step S6, factors of the busy responses of all of the ports, for example, the times and the numbers of busy responses are analyzed and the preferential processing port is decided. In step S7, a check is made to see if the decided preferential processing port is the same as the port disconnected in step S5 or not. When they differ, a unit end is responded from the decided port to the channel. The activation request in association with it is received in step S9 and the port is coupled and the transferring process is executed. In step S10, when the transferring process by the interruption is finished, a unit end is responded and the coupling is disconnected in step S11. In step S12, an interruption request of the retry start is performed from the disconnected port to the channel unit which is in the retry start waiting state due to the disconnection. By receiving the interruption request, the activation request is again executed from the channel in the retry start waiting state and is judged in step S1. In step S2, the port is again coupled with the channel and the transferring process is restarted. When the end of the restarted transferring process is judged in step S3, a unit end is responded in step S13 and the series of transferring processes are finished. On the other hand, in step S6, when the port to be most preferentially processed which was decided by analyzing the factors of the busy responses of all of the ports is the same as the port which was disconnected in step S5, the processing routine immediately advances to step S12 and the interruption request of the retry start is performed from the disconnected port and the transferring process by the recoupling is soon restarted.

As will be obviously understood from the flowchart of FIG. 22, when the interruption condition by the interruption timer is satisfied during the coupling of the high speed port (B) in FIG. 20, the preferential process of the low speed port (A) in the busy waiting state is decided and the transferring process on the low speed port (A) side is finished by the interruption. After that, the interrupted transferring process of the high speed port (B) is restarted. When the interruption condition by the interruption timer is satisfied during the processing on the low speed port (A) side, so long as the number of busy response times is deviated to the low speed port side, the same low speed port (A) as the disconnected port is again determined as a most preferential processing port. In this case, the transferring process at the low speed port (A) which was interrupted by the interruption request of the retry start for recoupling is immediately restarted. In dependence on a situation, there is also a case the transferring process on the high speed port side is preferentially processed during the processing of the low speed port. Although the embodiment of FIGS. 20 to 22 has been described with respect to the case where there are two ports (A and B) as an example, the eight ports (A to H) are provided for the magnetic tape control unit 10 as shown in FIG. 5. When receiving the interruption notification by the interruption timer, the retry interruption processing section 76 checks states of busy responses regarding the eight ports (A to H), thereby deciding the port to be preferentially processed.

Figure 23:
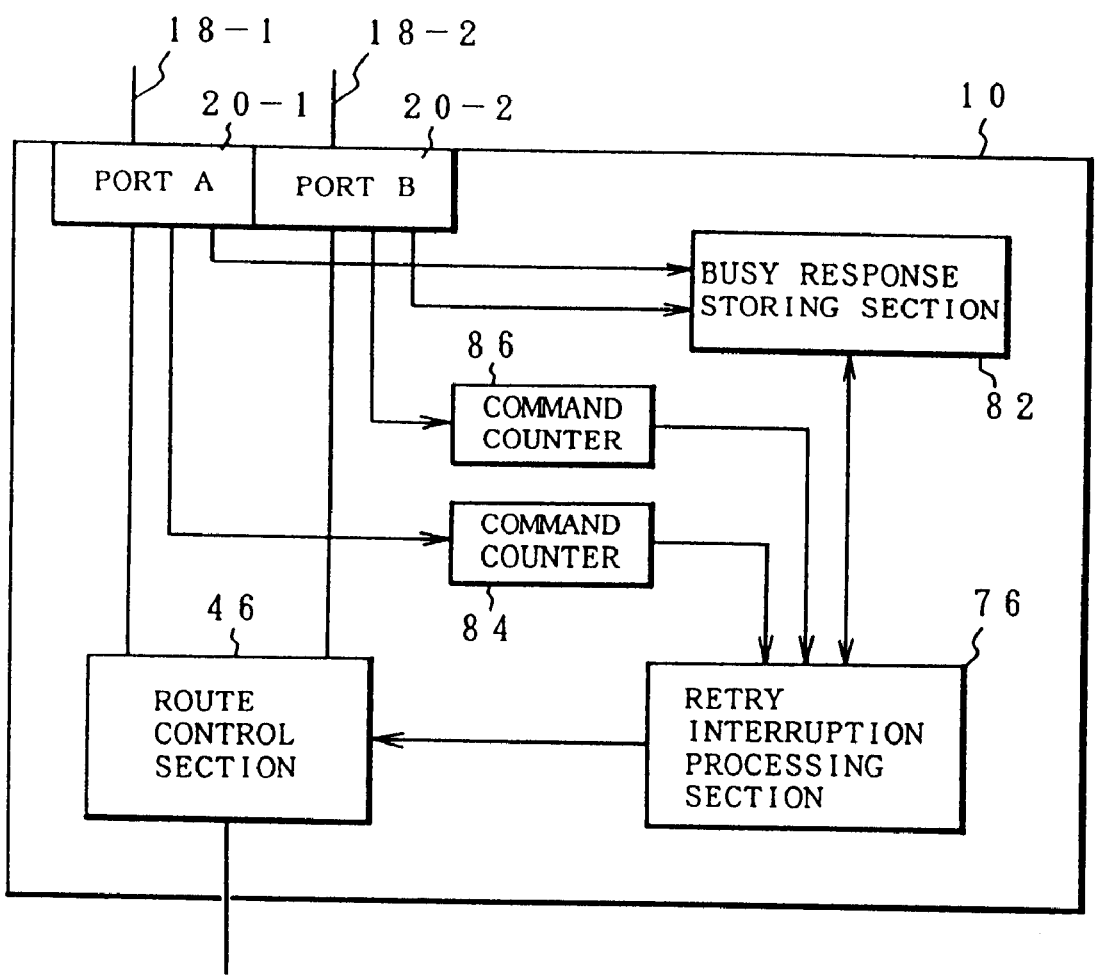
FIG. 23 is a block diagram of a modification of the fifth form of the invention.

FIG. 23 shows the second embodiment of the fifth form of the invention. The embodiment is characterized in that when a predetermined number of command processes are executed in each port, it is judged that the interruption condition is satisfied, so that the retry interrupting process is executed. The low speed port (A), high speed port (B), route control section 46, retry interruption processing section 76, busy response storing section 82, and command counters 84 and 86 are provided for the magnetic tape control unit 10. The command counter 84 counts the number of command executing times of the low speed port (A). The command counter 86 counts the number of command executing times of the high speed port (B). When a count value of the command counter 84 or 86 reaches a predetermined number, the retry interruption processing section 76 executes the retry interrupting process. For example, a series of command sequence is executed by the transferring process due to the coupling of the high speed port (B) and the command counter 86 counts up in association with the command execution. In this instance, when the retry interruption processing section 76 judges that the count value exceeds the predetermined number, a status response of the retry request is executed to the high speed channel (B) from the high speed port (B) that is at present being coupled, thereby disconnecting. After the disconnection, the retry interruption processing section 76 refers to the busy response storing section 82 and checks the states of the busy responses so far with regard to all of the ports (A) and (B). Specifically speaking, the newest response time and the number of busy responses in each of the ports (A and B) are checked. The port in which the busy response time is old and the number of busy responses is large is determined as a port to be most preferentially processed. In this case, the low speed port (A) is decided as a most preferential processing port. By receiving such a decision, the route control section 46 responds a busy end from the low speed port (A) to the low speed channel (A), thereby allowing the activation request to be performed to the low speed port (A) from the low speed channel (A) which received the busy end. By coupling the port (A), the transferring process is executed. When the transferring process by the interruption of the low speed port (A) is finished, subsequent to the response of the unit end from the low speed port (A), the retry interruption processing section 76 executes the interruption request of the retry start from the high speed port (B) and couples the port (B), thereby restarting the interrupted transferring process. The detailed retry interrupting process is substantially similar to that in the first embodiment shown in FIGS. 20 to 22 except that the number of command executing times of the ports (A and B) are counted by the command counters 84 and 86 and, when the command executing times reach the predetermined value, the retry interrupting process is started.

Figure 24:
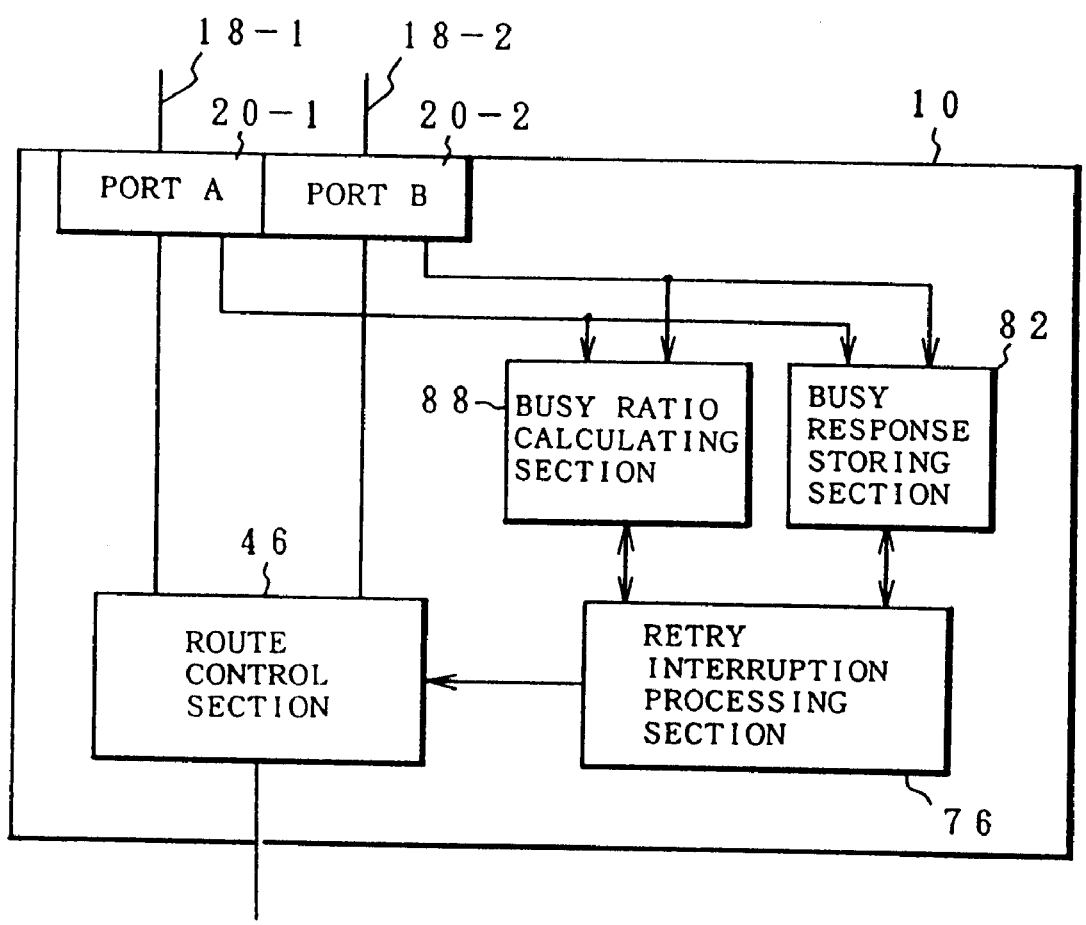
FIG. 24 is a block diagram of another modification of the fifth form of the invention.

FIG. 24 shows the third embodiment of the fifth form of the invention. This embodiment is characterized in that the retry interrupting process is executed when the busy ratio of each port reaches a predetermined value. The low speed port (A), high speed port (B), route control section 46, retry interruption processing section 76, busy response storing section 82, and further a busy ratio calculating section 88 are provided for the magnetic tape control unit 10. The busy ratio calculating section 88 can be realized by the activation number counters 54 and 60, busy number counters 56 and 62, and busy ratio measurement storing section 50 in FIG. 6. The retry interruption processing section 76 judges whether the busy ratio R1 of the low speed port (A) or the busy ratio R2 of the high speed port (B) that is calculated by the busy ratio calculating section 88 has reached a predetermined value or not. When the busy ratio R1 or R2 reaches the predetermined value, the retry interrupting process is started. The retry interrupting process is substantially similar to those in the first embodiment of the fifth form of FIG. 20 and the second embodiment of the fifth form of FIG. 23. Namely, a status of the retry request is responded from the port that is at present being coupled and the port is temporarily disconnected. The port to be most preferentially processed is decided with reference to the busy response storing section 82. A busy end is generated to the decided port, the activation request is accepted, and the transferring process is executed. When the transferring process is finished by the interruption, an interruption request of the retry start is performed to the disconnected port, the port is recoupled, and the interrupted transferring process is restarted. In the third embodiment, when the busy ratio reaches the predetermined value and the retry interrupting process is executed, the preferential processing port is decided from the situations of the busy responses of all of the ports, namely, the time of the busy response and the number of busy response times. However, the preferential processing port can be also decided by analyzing the busy ratios themselves which became the interruption factors. That is, it is sufficient to analyze the busy ratios of all of the ports and to decide the port of the highest busy ratio as a preferential processing port. Such a deciding method can be regarded as a decision of the preferential processing port by the analysis of the interruption factors themselves. With respect to the first embodiment of the fifth form of FIG. 20 and the second embodiment of the fifth form of FIG. 23, in a manner similar to the third embodiment of FIG. 25, by providing the busy ratio calculating section 88, the busy ratios of all of the ports are analyzed at the time of the retry interrupting process and the port of the highest busy ratio can be also determined as a preferential processing port.

[Making the Input/Output Ports Intelligent]

Figure 25:
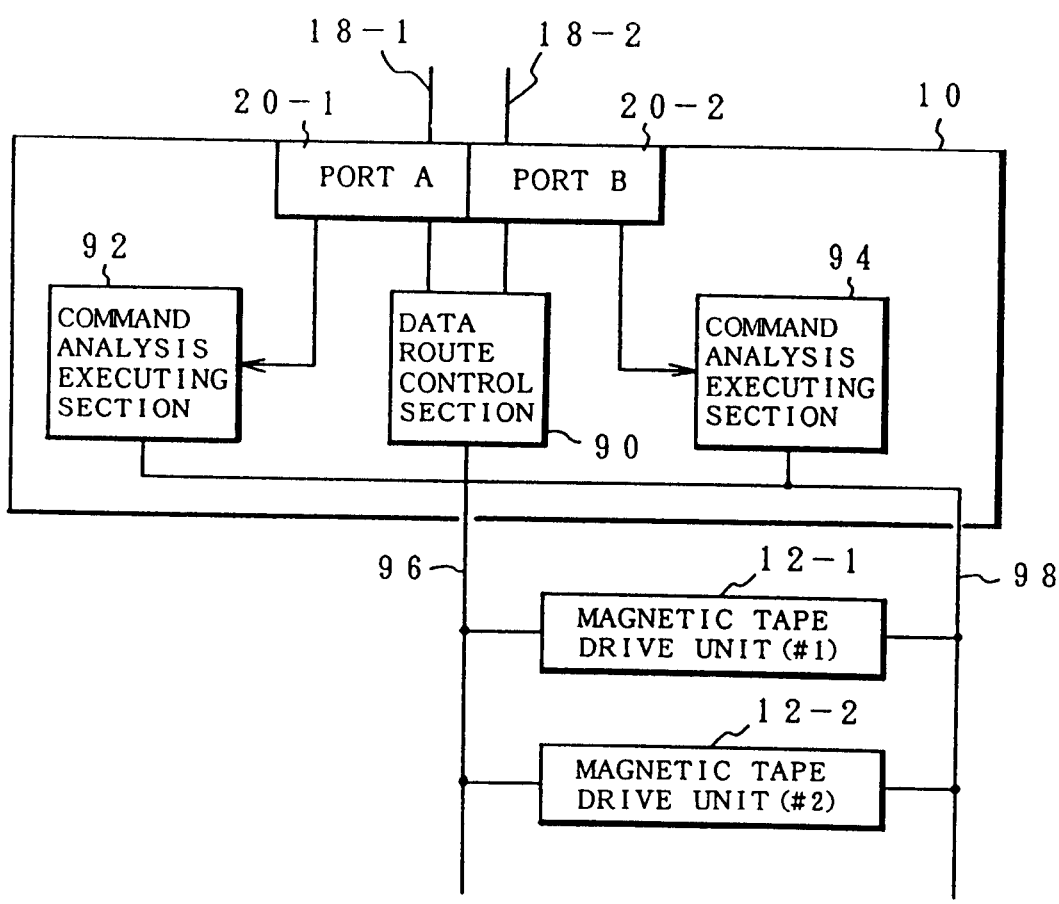
FIG. 25 is a block diagram of the sixth form of the invention.

FIG. 25 relates to the embodiment of the sixth form of the invention. The embodiment is characterized in that a command analyzing function is provided for each port, commands that can be executed during the processing of another port are analyzed, and processes are executed in parallel. In the magnetic tape control unit 10, a command analysis executing section 92 is provided for the low speed port (A) and a command analysis executing section 94 is provided for the high speed port (B). The command analysis executing sections 92 and 94 supply control signals to the magnetic tape control unit 10 and the lower magnetic tape drive units 12-1 and 12-2 by an independent control bus 98. A data transfer to the magnetic tape drive units 12-1 and 12-2 side is executed by a data bus 96. A data route control section 90 to switch the ports (A and B) is provided for the data bus 96. In the embodiments of the first to fifth forms described already, the command analysis executing section and data route control section are provided as one route control section for the magnetic tape control unit 10. Each of the command analysis executing sections 92 and 94 provided for the ports (A and B) analyzes the command received by the coupling with the channel in association with the activation request and discriminates whether the command is a command that can be executed even during the data transfer by the other port or not. As a command which can be executed during the data transfer due to the coupling of the other port, there are commands of a motion system for a loading operation, an unloading operation, a fast-forward operation, a rewinding operation, and the like of a magnetic tape on the magnetic tape drive units 12-1 and 12-2 side, commands of a sense system to notify the operating states of the magnetic tape drive units 12-1 and 12-2 side, and the like. On the other hand, as a command which cannot be executed during the data transfer by the coupling on the other port side, there are a read command and a write command. When the command analysis executing sections 92 and 94 receive the activation request during the data transfer by the coupling of the other port and analyze the reception of the command of the motion system or sense system, a coupling completion response is generated, the command is accepted without performing a busy response, and the command of the motion system or sense system is executed. In this case, the magnetic tape drive unit which executes the data transfer by the coupling of the other port and the magnetic tape drive unit of the command of the motion system or sense system which is executed in parallel have to be different units. Distinction between those units is checked by a drive ID which is received as a command parameter of the start I/O request. As device buses between the magnetic tape control unit 10 and the magnetic tape drive units 12-1 and 12-2 side in which the data transfer system, control system, and sense system can be independently processed, in addition to the independent buses of the control bus 98 and data transfer bus 96 shown in the diagram, a common bus construction such that the command process and data transfer can be simultaneously executed can be also used.

Figure 26:
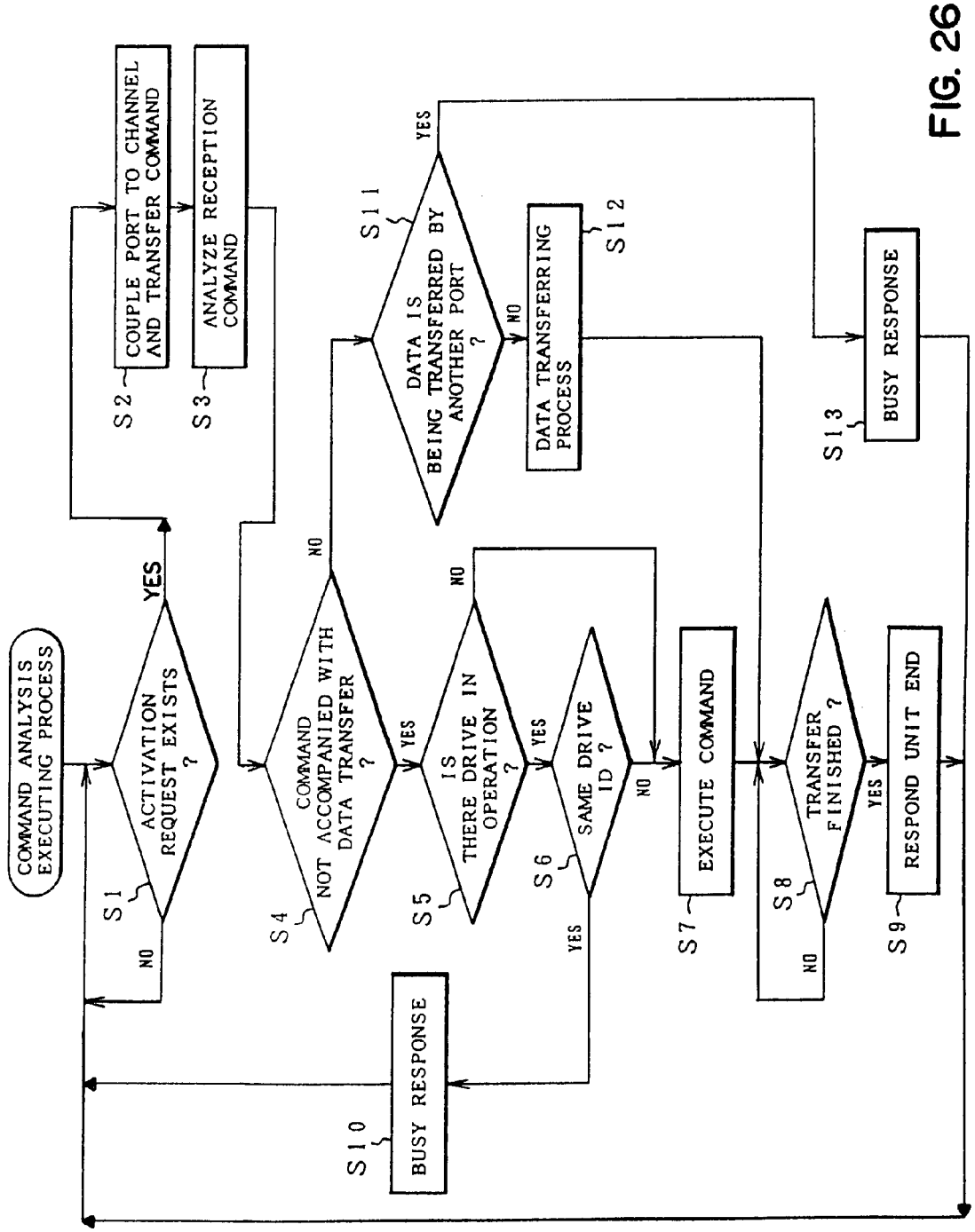
FIG. 26 is a time chart for an input/output process in FIG. 25.

A flowchart of FIG. 26 relates to the processing operation of FIG. 25. First in step S1, the presence or absence of an activation request to the port is checked. When the activation request is received, in step S2, the port is coupled to the channel and the transferring process of the command is executed. In step S3, the received command is analyzed. By the command analysis, it is possible to know that the received command is the command of the motion system which is not associated with the data transfer or the sense system. In step S4, a check is made to see if the received command is a command which is not associated with the data transfer, namely, a command of the motion system or a command of the sense system. In case of the command of the motion system or the command of the sense system, step S5 follows and a check is made to see if there is the magnetic tape drive unit in operation or not. If YES, a check is made in step S6 to see if the drive ID obtained by the analysis of the received command coincides with the drive ID of the drive unit that is at present operating or not. If YES, since the received command cannot be executed irrespective of the kind of command. Therefore, a busy response is returned in step S10. When the drive ID differs, since the command of the motion system or sense system can be executed, the received command is executed in step S7. In step S8, when the completion of the series of transferring processes in association with the command execution is judged, a unit end is responded in step S9 and the processing routine is returned to step S1. In case of the port which performed the busy response, a busy end is responded in association with the unit end. When the received command is a write command or read command accompanied with the data transfer in step S4, step S11 follows and a check is made to see if the data is being transferred by the other port or not. If YES, since the data cannot be transferred, a busy response is returned in step S12 and the processing routine is returned to step S1. When the data is not being transferred by the other port, since the write command or read command can be executed, the data transferring process in association with the command execution is executed in step S12. When the end of transfer is judged in step S8, a unit end is responded in step S9 and the processing routine is returned to step S1.

According to the invention as described above, even if a plurality of input/output ports of the input/output control unit are connected to the channel units on the host computer side by the channel buses of different transfer speeds, a situation such that the services for the input/output request are one-sided between a specific channel and the port can be certainly prevented. Even if the input/output requests from the channel units overlap, the services to each input/output port can be almost uniformly provided. Therefore, it is possible to certainly prevent that the apparatus enters a loop state of [busy-unit end] such that the activation request becomes a busy response between the low speed channel and the port and even if an activation request is performed again for the unit end, a busy response is executed. A situation such that the apparatus times over due to a response delay for the input/output request of the host computer and enters a check condition is avoided. The system performance can be guaranteed.

Each of the embodiments of the first to sixth forms of the present invention has been described above with respect to the input/output subsystem constructed by the magnetic tape control unit and magnetic tape drive unit using the magnetic tape as a memory medium. However, as input/output apparatuses other than the above system, the invention also incorporates other input/output control units regarding proper input/output apparatuses such as magnetooptic disk apparatus, magnetic disk apparatus, and the like. The invention is also not limited by the numerical values shown in the embodiments.

What is claimed is:

1. An apparatus for processing an input/output request from an upper unit by using a plurality of channel buses, comprising:

a plurality of input/output ports connected to a plurality of channel units on said upper unit side through a plurality of channel buses of different transfer speeds; and a command analysis executing section, provided for each of said plurality of input/output ports, for analyzing whether a command received in association with an activation request during the coupling of another input/output port is a command that can be executed or not, and when it is the executable command, for accepting said activation request and for executing a command process for internal resources.

2. An apparatus according to claim 1, wherein in the case where a data transfer of the internal resources is being executed by the coupling of the other input/output port, so long as the received command is a command of other internal resources and of a control system which is not accompanied with the data transfer, said command analysis executing section accepts the activation request and a command process for said other internal resources is executed.

3. An apparatus according to claim 1, wherein said internal resources are a plurality of input/output units having independent control buses for a common data bus.

4. A method of processing an input/output request from an upper unit by using a plurality of channel buses, comprising:

a command analyzing step of analyzing whether a received command is a command that can be executed or not in the case where a command is received by a specific input/output port in association with an activation request in a state in which another input/output port is being coupled; and a command executing step of accepting said activation request and executing a command process for internal resources in the case where it is analyzed in said command analyzing step that the received command is the command that can be executed in a state in which the other input/output port is being coupled.

5. A method according to claim 4, wherein in said command analyzing step, in the case where the data transfer of the internal resources is being executed by the coupling of the other input/output port, so long as said received command is a command of other internal resources and of a control system which is not accompanied with a data transfer, it is judged that said command is an executable command.

6. A method according to claim 4, wherein said internal resources are a plurality of input/output units having independent control buses for a common data bus.

* * * * *